(12) United States Patent
Karapantelakis et al.

(10) Patent No.: US 11,082,824 B2
(45) Date of Patent: Aug. 3, 2021

(54) METHODS AND DEVICES FOR SUPPORTING TRANSFER PROCESSES OF DATA IN WIRELESS COMMUNICATIONS NETWORK

(71) Applicant: Telefonaktiebolaget LM Ericsson (publ), Stockholm (SE)

(72) Inventors: Athanasios Karapantelakis, Stockholm (SE); Jing Fu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 402 days.

(21) Appl. No.: 15/322,859

(22) PCT Filed: Jun. 30, 2014

(86) PCT No.: PCT/SE2014/050812
§ 371 (c)(1),
(2) Date: Dec. 29, 2016

(87) PCT Pub. No.: WO2016/003329
PCT Pub. Date: Jan. 7, 2016

(65) Prior Publication Data
US 2017/0134886 A1 May 11, 2017

(51) Int. Cl.
| | |
|---|---|
| *H04W 4/80* | (2018.01) |
| *H04W 40/22* | (2009.01) |
| *H04B 7/155* | (2006.01) |
| *H04W 88/04* | (2009.01) |
| *H04W 84/18* | (2009.01) |

(52) U.S. Cl.
CPC .......... *H04W 4/80* (2018.02); *H04B 7/15507* (2013.01); *H04W 40/22* (2013.01); *H04W 84/18* (2013.01); *H04W 88/04* (2013.01)

(58) Field of Classification Search
CPC ....... H04W 4/80; H04W 40/22; H04W 84/18; H04W 88/04; H04B 7/15507
See application file for complete search history.

(56) References Cited

U.S. PATENT DOCUMENTS

| | | | |
|---|---|---|---|
| 7,760,645 B2 * | 7/2010 | Sendrowicz | H04W 4/16 370/236 |
| 2009/0191811 A1 | 7/2009 | Griffin et al. | |

(Continued)

FOREIGN PATENT DOCUMENTS

WO  2013178981 A1  12/2013

OTHER PUBLICATIONS

Liu et al., "Preference-aware Object Retrieval in Opportunistic Mobile Social Networks", IEEE published on Jul. 2013 (Year: 2013).*

(Continued)

*Primary Examiner* — Thinh D Tran
(74) *Attorney, Agent, or Firm* — Rothwell, Figg, Ernst & Manbeck, P.C.

(57) ABSTRACT

The present invention relates to methods and devices for supporting a transfer process of data in wireless communication networks. The transfer process comprises a decision step to relay data based on a comparison between a first data device's requirements on delivery time and a second device's estimate on the next time for obtaining network connectivity. In addition the transfer procedure considers the reliability required for a particular data piece and the probability of successful delivery provided by the relaying device.

26 Claims, 13 Drawing Sheets

(56) References Cited

U.S. PATENT DOCUMENTS

| | | |
|---|---|---|
| 2010/0008261 A1 | 1/2010 | Javaid et al. |
| 2012/0063389 A1 | 3/2012 | Abedi |
| 2012/0309309 A1 | 12/2012 | Cho et al. |
| 2013/0137441 A1 | 5/2013 | Kruglick |
| 2013/0155947 A1 | 6/2013 | Curlander |
| 2013/0254264 A1* | 9/2013 | Hankinson ........ H04L 29/06047 709/203 |
| 2013/0260678 A1* | 10/2013 | Ikemoto ................ H04W 28/06 455/41.1 |
| 2014/0161024 A1 | 6/2014 | Speight et al. |
| 2015/0109926 A1* | 4/2015 | Jin ........................ H04W 40/22 370/235 |

OTHER PUBLICATIONS

Anisi MH, Abdullah AH, Razak SA, Ngadi MA. An overview of data routing approaches for wireless sensor networks. Sensors (Basel). 2012;12(4):3964-3996. Published Mar. 27, 2012. (Year: 2012).*
International Search Report dated Mar. 30, 2015, issued in Application No. PCT/SE2014/050812, 5 pages.
Written Opinion dated Mar. 30, 2015, issued in Application No. PCT/SE2014/050812, 5 pages.
Extended European Search Report dated Jun. 14, 2017, issued in European Patent Application No. 14896304.4, 8 pages.

* cited by examiner

METHODS AND DEVICES FOR SUPPORTING TRANSFER PROCESSES OF DATA IN WIRELESS COMMUNICATIONS NETWORK

CROSS REFERENCE TO RELATED APPLICATION(S)

This application is a 35 U.S.C. § 371 National Stage of International Patent Application No. PCT/SE2014/050812, filed Jun. 30, 2014, designating the United States, the disclosure of which is incorporated by reference.

TECHNICAL FIELD

The present technology relates to methods and devices for supporting transfer processes of data in wireless communications network to intended end destinations via an server in a network.

BACKGROUND

There are devices that do not need to be continuously connected to a network. Such devices make use of each other to relay data until one of these devices obtains network connectivity.

Many devices may not have network connectivity when they need to transmit data to a server over a network (including but not limited to the Internet, corporate Wide or Local area networks and small-scale Local Area Networks). When two devices have temporary connectivity using short-range communication, a data device, which has data to transmit towards the network, can request a relay device for relaying this data.

Example of such devices could be weather sensors in remote locations without mobile network coverage, where devices are configured to upload weather data to the server when there is an opportunity. Another example is a user of a mobile phone roaming to another country wanting to read or send their email but having no data connection to an operator's network. In this case, users can request network connectivity from The opportunity of data transfer and relay with wireless short-range communication occurs when one data device moves in the proximity of another data device. The data device to be used as relay device may not have network connection for the moment, but might obtain connectivity it in a near future.

However, one problem with known relay procedures is that a data device relays data to another data device, and drops the stored data relying on that the relay device will connect to the network within an acceptable time. Acceptable time in this context is that the data is still valid. The relay device may not connect to the network within an acceptable time resulting in the data being considered invalid or irrelevant. In worst case, the relay device may not connect to the network at all in which case the data is lost on the way to the end destination.

SUMMARY

One object of the methods and devices described herein is to provide a technique for more reliable data transfer than the known wireless relay methods are used.

Methods and devices are provided for making decision to relay data and data pieces based on a comparison between the first data device's requirements on delivery time and the second device's estimate on the next time for obtaining network connectivity are provided. In addition the relaying procedure considers the reliability required for a particular data piece and the probability of successful delivery provided by the second device.

According to one aspect, a method and embodiments thereof are provided, wherein said method is meant for transferring data pieces from a first data device to an intended end destination by means of at least one second data device. Each of said at least one second data devices is capable of acting as a relay device. Said method comprises steps of establishing short-range communication with a second data device; sending a request to relay one or more identified data pieces to said second data device being capable of acting as a relay device; receiving a response comprising information regarding which one or more identified data pieces that are accepted by said second data device for relaying and information regarding estimated next network connectivity time and an estimated probability for next network connectivity for said second data device; and making a data transfer decision for an identified data piece based on said information regarding estimated next network connectivity time and the estimated probability for next network connectivity for said second data device and a corresponding transfer probability and data piece deadline for said identified data piece. The method further comprises the step of sending based on said data transfer decision either one or more identified data pieces or a relay abortion to said second data device.

It is further provided a corresponding method and embodiments thereof performed in a second data device capable of acting as a relay device for one or more data pieces received from a first data device. The second data device relays the data pieces either via a relaying server connectable to said end destination, or via one or more second devices acting as relay devices to the relaying server connectable to said end destination. Said method comprises steps of establishing short-range communication with the first data device; receiving a request to relay one or more identified data pieces; making a selection decision for each of said one or more identified data pieces; and sending a response comprising information regarding which one or more identified data pieces are accepted by said second data device for relaying and information regarding estimated next network connectivity time and an estimated probability for next network connectivity for said second data device.

According to yet another aspect, a first data device and embodiments thereof is provided herein. The first device is adapted for transferring data pieces to an intended end destination a server by means of at least one second data device. Each of said at least one second data devices being capable of acting as a relay device. The first data device comprises a processing circuitry, which is operative to establish short-range communication with a second data device, send a request to relay one or more identified data pieces to said second data device being capable of acting as a relay device, and receive a response comprising information regarding which one or more identified data pieces that are accepted by said second data device for relaying and information regarding estimated next network connectivity time and an estimated probability for next network connectivity for said second data device. The processing circuitry of the first device is further operative to make a data transfer decision for an identified data piece based on said information regarding estimated next network connectivity time and the estimated probability for next network connectivity for said second data device and a corresponding transfer probability for said identified data piece, and data piece deadline for said identified data piece, and operative for sending based on said data transfer decision either one or more identified data pieces or a relay abortion to said second data device.

According to yet another aspect, a second data device and embodiments thereof is provided and adapted for relaying data pieces to an intended end destination. The data pieces are received from a first data device. The second data device relays the data pieces either via a relaying server connectable to said end destination, or via one or more second devices acting as relay devices to the relaying server connectable to said end destination. The second data device comprises a processing circuitry which is operative to establish short-range communication with the first data device; receive a request to relay one or more identified data pieces; make a selection decision for each of said one or more identified data pieces; and to send a response comprising information regarding which one or more identified data pieces are accepted by the data device for relaying and information regarding estimated next network connectivity time and an estimated probability for next network connectivity for the data device.

It is further provided a method, and embodiments thereof, in a server for forwarding data pieces to intended end destinations. The server may be a network host which acts as a proxy for incoming data pieces from data devices, wherein first data devices communicates via short-range communication with one or more second data devices capable of operating as relay devices.

Said method comprises the steps of establishing a connection with a data device via a radio access point; receiving a request to relay one or more identified data pieces; making a selection decision for each of said one or more identified data pieces; sending a response comprising information regarding which one or more identified data pieces are selected; receiving one or more data pieces; forwarding one or more data pieces towards the data piece's addressed end destination; updating a table with data IDs of the data pieces forwarded; and sending an acknowledgement for each received data piece to the second data device.

It is also provided herein, a server adapted for forwarding data pieces to intended end destinations. The server may be a network host which acts as a proxy for incoming data pieces from data devices, wherein first data devices communicates via short-range communication with one or more second data devices capable of operating as relay devices. The server comprises a processing circuitry which is operative to establish a connection with a data device via a radio access point; receive a request to relay one or more identified data pieces; make a selection decision for each of said one or more identified data pieces; send a response comprising information regarding which one or more identified data pieces are selected; receive one or more data pieces; forward one or more data pieces towards the data piece's addressed end destination; update a table with data IDs of the data pieces forwarded; and to send an acknowledgement for each received data piece to the second data device.

One advantage of the methods and devices described herein is that a more reliable technique for delivering data and/or data pieces to an end destination is provided as the transferring process or procedure considers the reliability required for a particular data piece and the probability of successful delivery provided by the relaying device.

BRIEF DESCRIPTION OF THE DRAWINGS

The foregoing, and other, objects, features and advantages of the present technology will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present technology. However, it will be apparent to one skilled in the art that the present technique may be practiced in other embodiments that depart from these specific details. In other instances, detailed descriptions of well-known methods, devices, and circuits are omitted so as not to obscure the description of the present technology with unnecessary detail.

The proposed technique considers data devices, which may not have continuous network connectivity. The data devices make use of each other to wirelessly relay data, i.e. transfer data from one entity to another until one of these devices obtains network connectivity. That technique is called hopping from data device to data device until it reaches the wired network. The data devices are capable of communicating wirelessly by means of a radio interface operating in the radio frequency domain, preferably via a suitable telecommunication standard.

In the following, the term data piece is used as a generalising term for a whole data block or a part of a whole data block constituting a unit, e.g. data file, etc.

Figure 1:
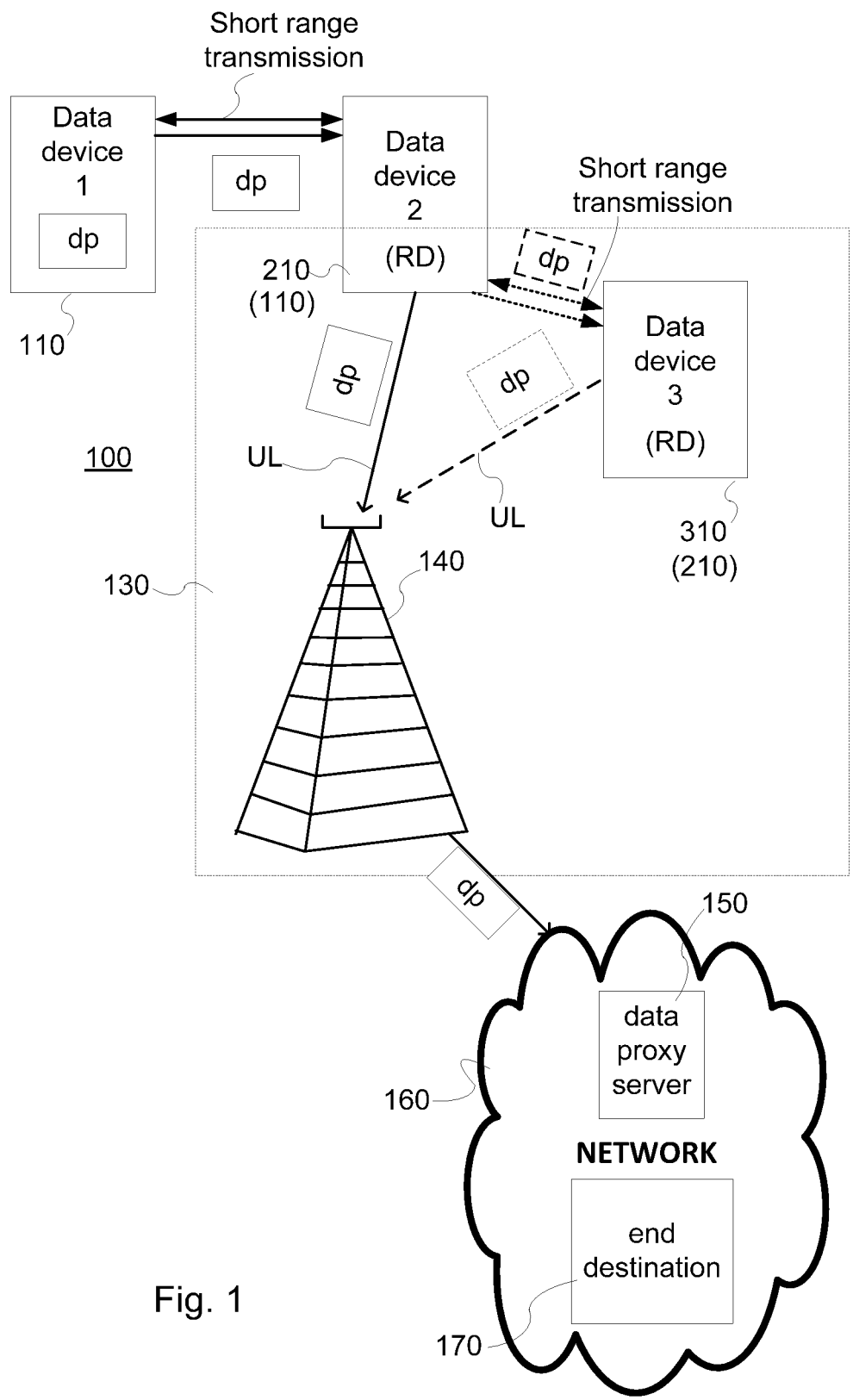
FIG. 1 is a block diagram schematically illustrating three data devices communicating via short range transmission.

FIG. 1 is a block diagram schematically illustrating three data devices communicating via short-range transmission.

In FIG. 1 is illustrated a data device 110 marked Data device 1, a data device 210 marked Data device 2, and a third data device 310 marked Data device 3. Said data devices are capable of communicating with other data devices via a short-range transmission system. Protocols for this short-range transmission system include but are not limited to protocol stacks based on the standard IEEE 802.15.4 document, such as the Xbee and CoAP/MQTT, 6LoWPAN protocol stacks; or Bluetooth; or the standard document IEEE 802.11.x protocol stacks. CoAP stands for Constrained Application Protocol and MQTT for Message Queuing Telemetry Transport. 6LoWPAN is an acronym of IPv6 over Low power Wireless Personal Area Networks. Two data devices can have temporary connection using short-range communication.

A data device is herein any communication device, or user equipment (UE), operating in the radio frequency region. Examples of data devices are smart phones, laptops, mobile terminals, tablets (e.g. Ipads) etc. A data device comprises at least one receiver and/or transmitter or a transceiver, which is a combined receiver and transmitter.

FIG. 1 also illustrates different paths for a data piece (DP) that has been generated by the first data device 110 and addressed to an intended end destination 170.

The Data device 1 has a DP to be transmitted towards an end destination 170 in a network 160.

Any data device is denoted a first data device when it requests another device for transferring by relaying data, stored or buffered in the data device, at least a part of the destination to an intended end destination. By intended end destination is meant that the data pieces or the data packets of the data pieces may contain an IP address of the end destination. The other device receiving a request to relay data is herein denoted second data device or relay device.

The decision to relay this data is based on a comparison between the first data device's requirements on delivery time and the relay device's estimate on the next time for obtaining network connectivity. In addition the relaying procedure considers the reliability required for a particular data piece and the probability of successful delivery provided by the relaying device.

It is possible that a data piece originating from a data device, i.e. a source device, is relayed multiple times until it finally reaches its network destination. Also, it is possible a device acts both as first data device and relaying device, RD, during a short-range communication. The relaying device is herein denoted as a second data device 210.

When a data device is wirelessly connected to a network 160 via an access point, AP, 140 by means of a standardized Radio Access Technology (RAT), it uploads via an uplink UL the data to a server 150, e.g. a proxy server, which forwards the data towards in the wired network 160 and further to its final end destination 170. The data device has to be within an area 130, such as e.g. a cell in a wireless telecommunications system, to achieve connectivity via a link UL with the AP 140.

A first path may involve Data device 1 and Data device 2. In a first hop or transfer sub-step of the transferring process, the data piece is transferred from Data device 1 to Data device 2 via short range communication, wherein the DP is buffered to be relayed either to an AP 140 or to another data device, e.g. Data device 3. If the Data device 2 enters a cell 130, the Data device is able to relay the DP to the AP 140. If the Data device 2 is not within an area 130 covered by an AP 140, it may relay the DP to another Data device, when it gets connectivity to said other Data device.

In FIG. 1 is second path and transferring process is illustrated involving Data devices 1, 2 and 3. In a first hop or transfer sub-step, the data piece DP is transferred from Data device 1 to Data device 2 via short range communication, wherein the DP is buffered in Data device 2. In a second hop or transfer sub-step, the data piece is transferred from Data device 2 to Data device 3 via short range communication, wherein the DP is buffered to be relayed either to an AP 140 or to another data device. As the Data device 3 enters or is roaming in cell 130, the Data device 3 is able to relay the DP to the AP 140 in a third hop or transfer sub-step. Data device 3 uploads the DP via an uplink UL to a server 150, e.g. a proxy server, which forwards the data in the wired network 160 to its final end destination 170.

As already mentioned, the decision to relay data is based on a comparison between the first data device's requirements on delivery time and the relay device's estimate on the next time for obtaining network connectivity. In addition the relaying procedure considers the reliability required for a particular data piece and the probability of successful delivery provided by the relaying device.

In the following description, the relaying procedure and the involved decision process are described in more detail.

Figure 2:
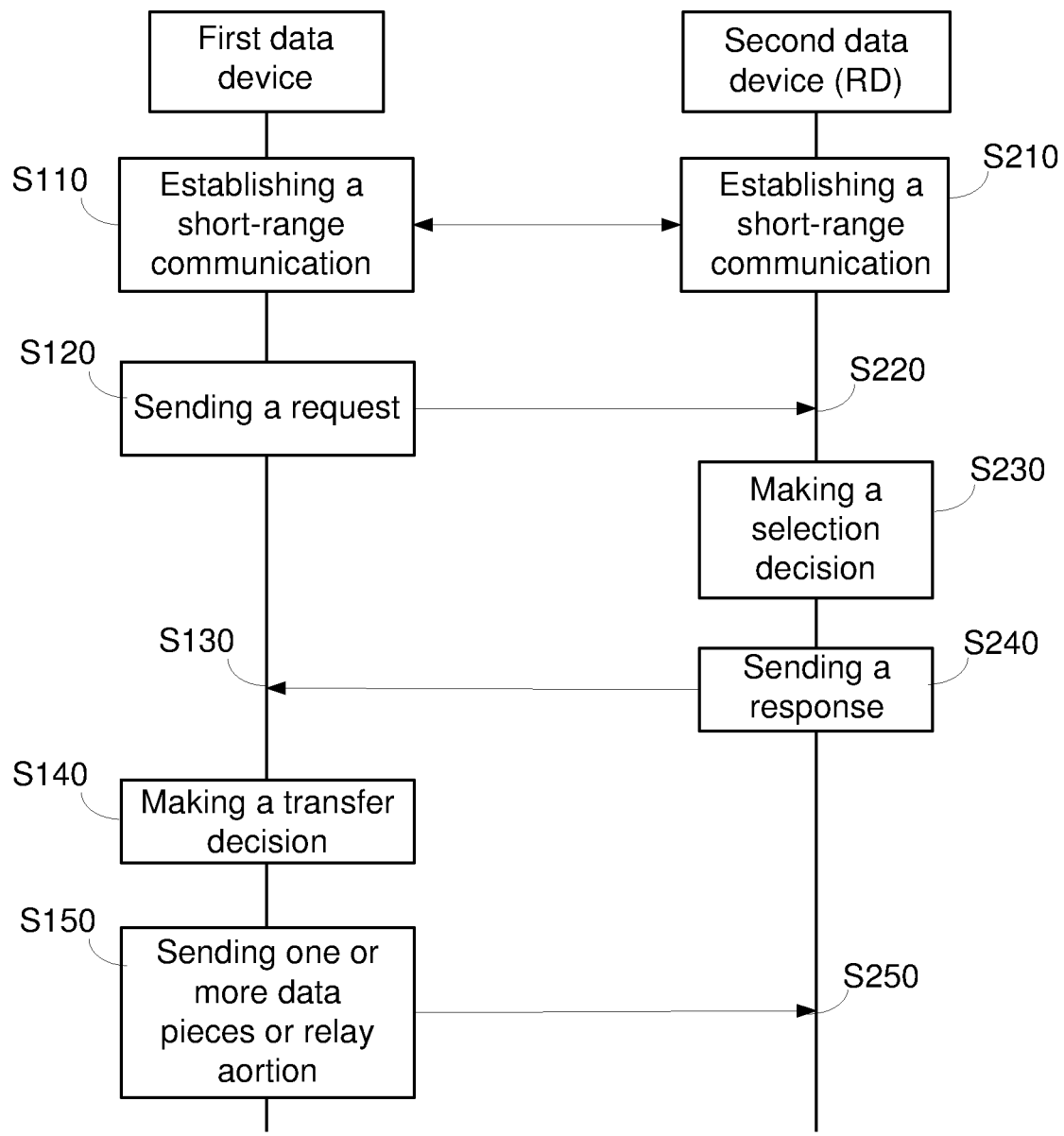
FIG. 2 is a signalling scheme illustrating a data piece transferring process.

FIG. 2 is a signalling scheme illustrating a data piece transferring process.

The transferring process comprises one method S100 in the first data device and a corresponding method S200 in a second data device. The cooperation of said methods S100, S200 is described and explained in with reference to the description with reference to FIG. 2 and following drawings.

When a second data device comes within the distance for establishing short-range communication with a first data device, the first and second devices establish connection according to a suitable short-range communication standard, indicated as steps S110 and S120, respectively. Then, the first data device sends to said second data device a request to relay one or more identified data pieces, indicated as step S120. The second data device receives the sent request, indicated as step S220.

For enabling the present transfer process, both data devices are provided with a data description table and a transfer window table.

Every data device has a buffer for storing different data pieces to be sent to the network, e.g. sensor readings. The buffer of the device may not only store its own generated data pieces, but may also store relayed data pieces from other devices. In addition to raw data, information about the data pieces is stored in a data description table, see table 1. Each entry in the description table contains the following attributes: Data ID, Transfer Deadline, Transfer Probability.

TABLE 1

Data Description Table, wherein each row represents
a data piece in the device's buffer.

| Data ID | Transfer Deadline, $t_d$ | Transfer Probability |
|---------|--------------------------|----------------------|
| 1.2 | 2014.01.02 9:00 | 0.4 |
| 1.5 | 2014.01.03 10:00 | 0.9 |
| 1.7 | 2014.01.04 21:00 | 0.5 |
| 2.1 | 0 | 0.3 |
| 6.2 | 2014.01.05 9:00 | 0.4 |

The Data ID is a globally unique identifier for each data piece. It consists of two parts; a source device ID, which is a unique identifier of the data device which generated the data, e.g. the serial number of the data device, and a device-specific data piece ID, which is an increment the source device created for the specific data piece.

The transfer deadline specifies when a data piece should be sent to the destination at the latest. This value is set from the data device that created the data, herein denoted source device. If the transfer deadline is set to 0, then there is no deadline for the data piece delivery and the data device will keep trying to send the data piece indefinitely. If the transfer deadline for a data piece has passed, the data piece is removed from the data device and the data description table.

When a data piece is generated, the transfer probability indicates the required reliability of successful data delivery, with the value between 0 and 1 based on the importance of the data piece.

The transfer probability is also used when relaying data. During each relay, the transfer probability may be updated both at the data device and relaying device. Details of updating transfer probability are described in further below.

The sequence diagram in FIG. 2 shows message exchange between a first data device requesting for its data to be relayed, indicated as data device, and a second data device for relaying said data, indicated as relay device. After a connection between two data devices is established, the first data device sends a data relay request, S220, to the relay device with the data IDs of all the data pieces.

Subsequently the second data device makes a decision, step S230, on whether to accept or deny relaying each of the data pieces in the request. The selection decision is based on whether the second device already has this data piece(s). To find out, it compares whether each data ID from the data device's request is already stored in the second data device's data description table. Once the relay device selects the data pieces that could be relayed from the data device, it responds to the data device's request by sending back the IDs of the selected data pieces, together with a list of data transfer windows. The transfer windows show the devices own estimate of its next network connectivity time for data delivery with probabilities. Table 2 illustrates an example of such a list. Basically it shows that the device have 50% of probability to have network connectivity before 2014.01.02 9:00, and 60% before 2014.01.03 9:00, and 90% before 2014.01.04 9:00. The later a time window is scheduled, the higher the reliability for sending a data piece becomes.

TABLE 2

Transfer Windows table example, showing the probability of data transfer towards the network for the next 3 days.

| Transfer Window $t_w$ | Network Connection Probability, $P_{relay}$ |
| --- | --- |
| 2014.01.02 9:00 | 0.5 |
| 2014.01.03 9:00 | 0.6 |
| 2014.01.04 9:00 | 0.9 |

The first device receives the sent response, S130, which comprises information, i.e. data ID, regarding which one or more identified data pieces that are accepted by said second data device to be relayed. It may further comprise information regarding estimated next network connectivity time and an estimated probability, $P_{relay}$, for next network connectivity for said second data device.

Having received the response, the first data device makes a data transfer decision, S140, for an identified data piece based on the estimated next network connectivity time and the estimated probability, $P_{relay}$, for next network connectivity for said second data device and a corresponding transfer probability, $P_{data}$, and data piece deadline for said identified data piece, as well.

Based on said data transfer decision, the first data device sends in step S150 either one or more identified data pieces or a relay abortion to said second data device.

The second data device receives, S250, either one or more identified data pieces or a relay abortion. If the second data device one or more data pieces, it is adapted to store, in a sub-step of S250, said one or more data pieces in a memory storage, which may be dedicated for data pieces to be forwarded by a relaying process, as described herein.

The second data device may further be adapted to update its data description table by adding the data description values for received and stored data pieces.

The second data device may further send an acknowledgement for each received data piece to the sending first data device In a second scenario, the second data device may not have selected any of the data pieces to be relayed from the second data device. The selection decision gave the result due to the fact that the second device already had all offered data pieces, i.e. each data ID from the first data device's request was already stored in the second data device's data description table. The second data device then responds to the first data device's request by sending back an empty list of data IDs.

Upon receiving a response with no specified data ID, the data transfer decision at the first data device results in the sending of a relay abort message to the second data device and the short-range communication may be ended.

The relay abort message may also be sent, when the data transfer decision at the first data device results in that no identified data piece should be sent due the second data device does not offer:

an estimated next network connectivity time that is later than any of the data piece deadlines; or
the estimated probability, $P_{relay}$, for next network connectivity for said second data device is much more less than any of any corresponding transfer probabilities, $P_{data}$, for the data pieces.

Figure 3:
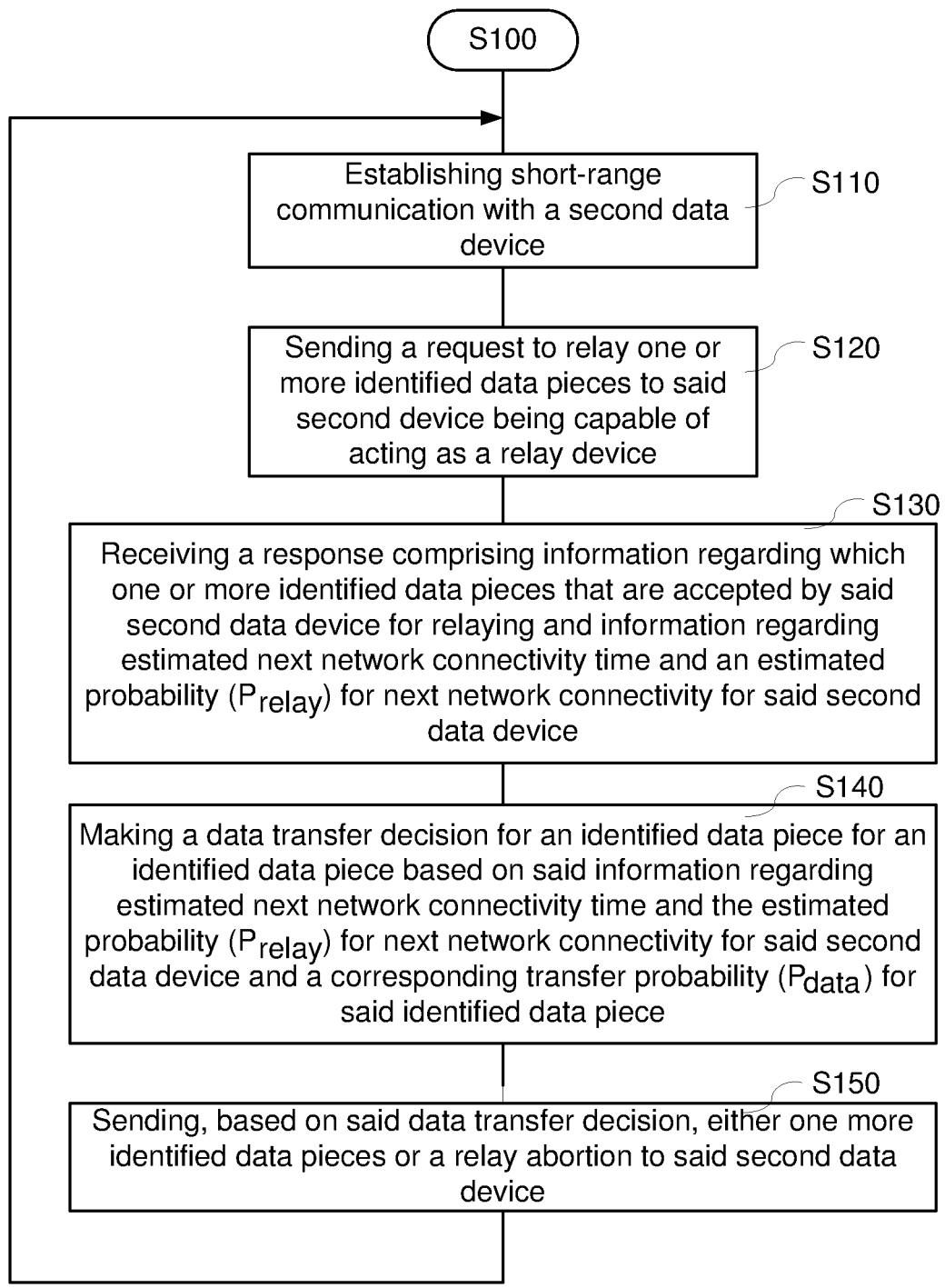
FIG. 3 is a flowchart showing a method of the transferring process in a first data device.

FIG. 3 is a flowchart showing a method of the transferring process in a first data device.

The transferring process comprises a method S100, which enables a first data device (110 in FIG. 1) to transfer data pieces to a server site (150 in FIG. 1) or end destination (170 in FIG. 1) by means of at least one second data device (210 in FIG. 1). Each of said at least one second data devices is capable of acting, i.e. operating, as a relay device by forwarding data pieces via a radio interface towards an intended end destination, e.g. an address that is given in the data pieces. Said method comprises:

S110:—Establishing short-range communication with a second data device;

S120:—Sending a request to relay one or more identified data pieces to said second data device being capable of acting as a relay device;

S130:—Receiving a response comprising information regarding which one or more identified data pieces that are accepted by said second data device for relaying and information regarding estimated next network connectivity time and an estimated probability, $P_{relay}$, for next network connectivity for said second data device;

S140:—Making a data transfer decision for an identified data piece based on said information regarding estimated next network connectivity time ($t_w$) and the estimated probability, $P_{relay}$, for next network connectivity for said second data device and a corresponding transfer probability, $P_{data}$, and data piece deadline for said identified data piece;

S150:—Sending based on said data transfer decision either one or more identified data pieces or a relay abortion to said second data device.

The transfer probability, $P_{data}$, is a probability value indicating the importance of the identified data piece and the required reliability of successful data delivery.

The identified data piece is identified by means of a globally unique identifier, Data id. Said unique identifier has been generated by a data device being the source of the data piece and using an identifier of said data device and an identifier of said data piece generated by said data device being the source of the data piece.

In S140, it is decided for each of the accepted data pieces whether it should be sent or not. If all accepted data pieces are aborted in the decision step, a relay abortion message is sent to the second data device.

According to one embodiment of the method, the making of the data transfer decision S140 for an identified data piece may be based on a transfer deadline, $t_d$, for said identified data piece. If $t_d$ for a data piece will expire before any of the received transfer windows $t_w$ will occur, said data piece will not be transferred to the second data device.

As already described above, a data description table may be used, wherein the globally unique identifier Data ID, transfer deadline $t_d$ and transfer probability $P_{data}$ for an identified data piece are data description values stored as a data piece entry in the data description table.

In the data transfer decision in S140, it is decided which data pieces that can be transferred, but it also decided which value to be used as the data description value when transferred together with the corresponding data piece to the second data device. For instance, if the received $P_{relay}$ is less than the $P_{data}$ for a data piece to be transferred, the first device may be adapted to replace the present $P_{data}$ value with the value of the received $P_{relay}$. Hence, a $P_{data,\,new} = P_{relay}$ is transferred as one of the data description values together with the data piece. This scenario is illustrated and discussed in connection to FIGS. 12A, 12B and 12C.

Figure 4:
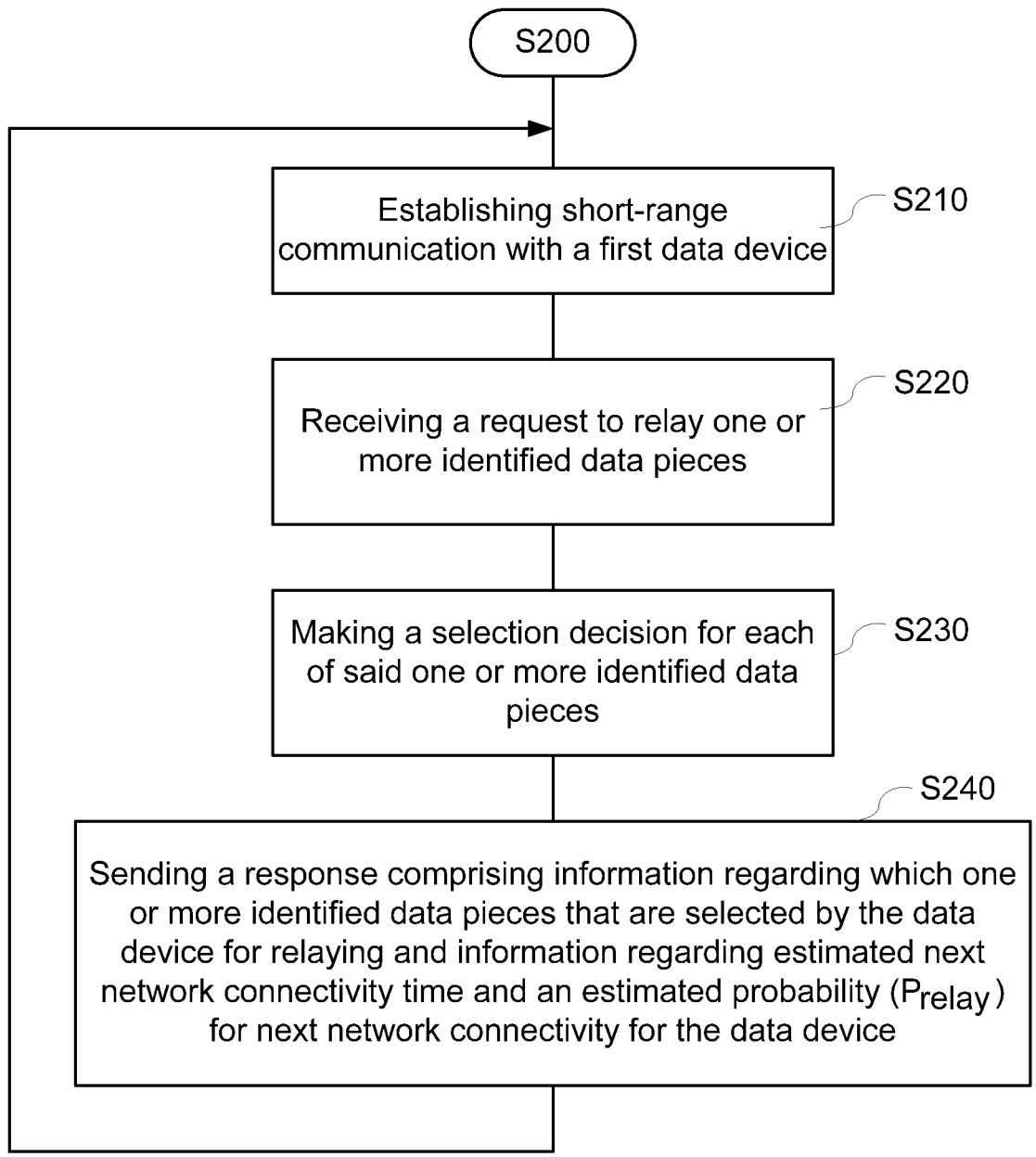
FIG. 4 is a flowchart showing a method of the transferring process in a second data device.

FIG. 4 is a flowchart showing a method of the transferring process in a second data device The transferring process comprises a method S200 which is performed in a data device acting as relay device, i.e. a second data device. The data device (210 in FIG. 1) is capable of acting as a relay device for one or more data pieces received from a first data device (110 in FIG. 1). Said one or more data pieces DP have an intended, e.g. addressed, end destination in a network. The data pieces are received from a first data device or a second data device (210 in FIG. 1) acting as a relay device. The second data device is configured to relay as a data device the data pieces either via a relaying server connectable to said end destination, or via one or more second devices acting as relay devices to the relaying server connectable to said end destination.

The method comprises:

S210:—establishing short-range communication with the first data device;

S220:—receiving a request to relay one or more identified data pieces;

S230:—making a selection decision for each of said one or more identified data pieces;

S240:—sending a response comprising information regarding which one or more identified data pieces are selected by the data device for relaying and information regarding estimated next network connectivity time and an estimated probability, $P_{relay}$, for next network connectivity for said data device.

In step S230, the second data device makes a decision on whether to accept or deny relaying each of the data pieces in the request. The selection decision is based on whether the second device already has this data piece(s). To find out, it compares whether each data ID from the data device's request is already stored in the second data device's data description table.

Each transfer of data pieces between two data devices is performed in a transfer sub-step between a first data device sending the data pieces to a receiving second data device. In the next following transfer sub-step, the relay device that was acting as a second data device in the previous transfer sub-step is adapted to perform the method S100 with another data device adapted to operate as a relay device, said another data relay device performs the method S200. Thus, a relay device is configured to act, or operate, as a second data device performing method S200 in one transfer sub-step of a transferring process, and in the following transfer sub-step the same data device is configured to act, or operate, as a first data device performing method S100. Transfer sub-steps comprising methods S100 and S200 are repeated until a relay device is able to establish contact and connection with an Access Point, AP, of a network.

Figure 5:
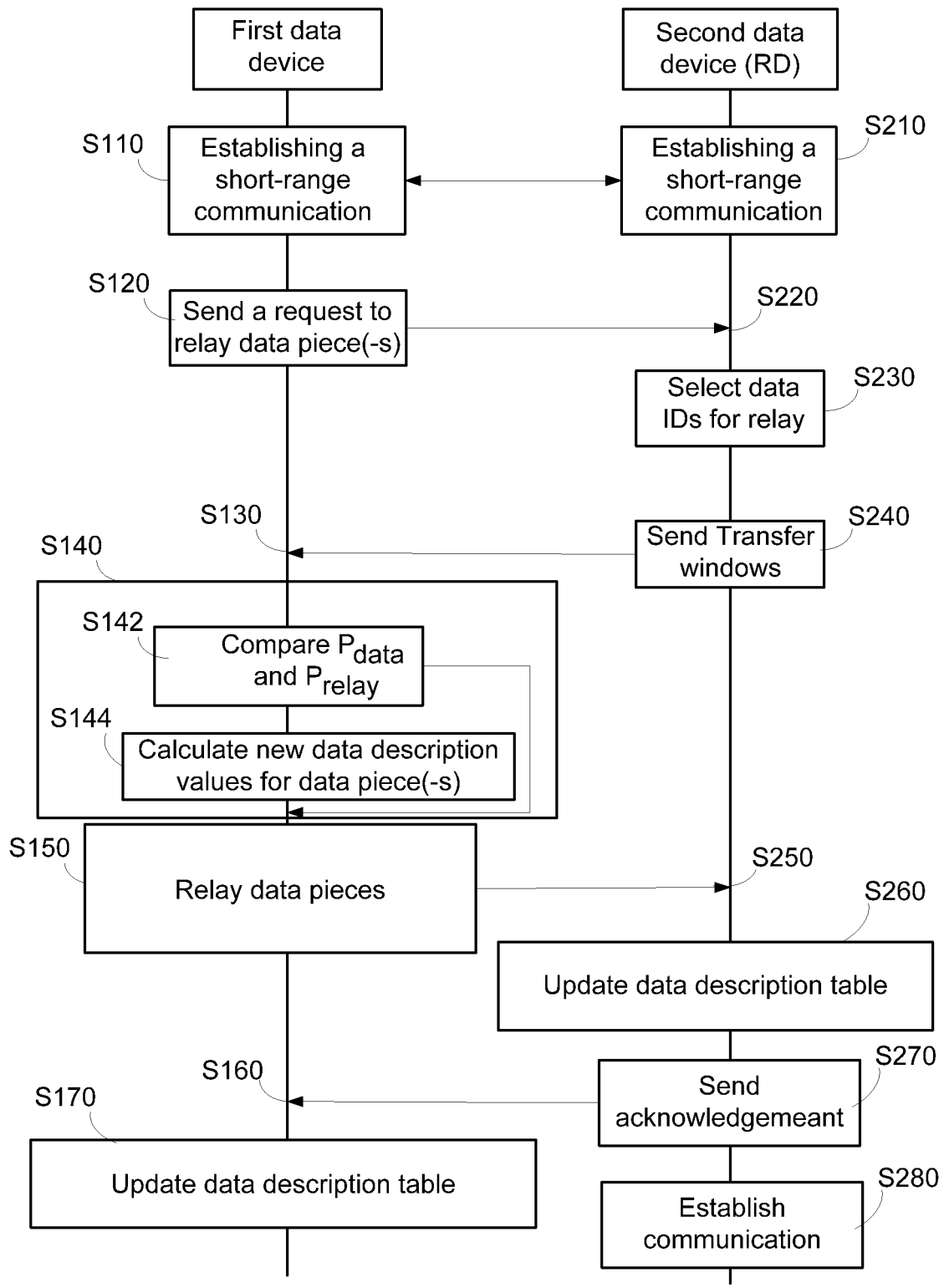
FIG. 5 is a signalling scheme illustrating an embodiment of the data piece transferring process.

FIG. 5 is a signalling scheme illustrating an embodiment of the data piece transferring process.

The signalling in this scenario is similar to the signalling described in the text corresponding to FIG. 2 up to the data transfer decision in S140.

Having received the response, in S130, the first data device makes a data transfer decision, in S140, for an identified data piece based on the estimated next network connectivity time $t_w$ and the estimated probability, $P_{relay}$, for next network connectivity for said second data device and a corresponding transfer probability, $P_{data}$, and data piece deadline $T_d$ for said identified data piece, as well. Said decision is made for each data piece accepted or allowed by the second data device.

According to some embodiments of the transferring process, in sub-step S142 of S140, the first data device compares $P_{data}$ values of the data pieces accepted to be sent to the second data device and $P_{relay}$ which is the network connectivity probability of the relay device, i.e. the second data device.

Based on said comparison in S142 of S140, the first data device is adapted to calculate new data description values, in S144, for data pieces that have been accepted by the second data device depending on whether $P_{relay}$ is less or equal to $P_{data}$ for any data piece to be sent.

In the case of $P_{data} <= P_{relay}$, i.e. $P_{data}$ is less or equal to $P_{relay}$, it suggests that the relay device's promise to deliver data $P_{relay}$ is higher than the required reliability $P_{data}$ for data delivery, it is possible to remove this data piece from the buffer where it is stored and corresponding data description values from the data description table, and let the second data device handle the data piece from now on.

In the case of $P_{data} > P_{relay}$ it suggests that the relay device's promise the relay data is lower than the required reliability for data delivery, so even after relaying, it is needed to continue hold the data for future probabilistic delivery. However, the $P_{data}$ for the kept data piece can be updated by calculating a $P_{data,new}$ as the first data device is not no longer solely responsible for the data delivery of the data piece in question.

A new $P_{data}$ is calculated in a step S144 if the estimated probability, $P_{relay}$ for next network connectivity for said second data device is less than the transfer probability, $P_{data}$, for the identified data piece.

When calculating a new transfer probability, $P_{data,\,new}$, for the identified data piece, different suitable formulas may be used. One example of such a formula is $$P_{data,new} = (P_{data} - P_{relay})/(1 - P_{relay})$$

Thus, after a data piece and corresponding data description values has been relayed according to step S150, the data description table needs to be updated, both at the second data device in step S260 and the first data device in step S170. The first data device can decrease the value of its transfer probability $P_{data}$ to $P_{data,\ new}$, as the second data device is taking over some delivery responsibility.

The second data device will set the transfer probability $P_{data}$ equal to the probability $P_{relay}$ of its next network connectivity time, in step S260. Basically, it could be regarded as the second data device's promise to the first data device.

The method S200 of the transfer process may further comprise a step S250:
  receiving one or more identified data pieces, or
  receiving a relay abortion.

The method may further comprise:
  storing received one or more data pieces in a dedicated memory storage.

The second data device receives said one or more data pieces in step S250. The method may also involve a step 260 wherein the second data device stores said one or more data pieces in a memory storage, which may be dedicated for data pieces to be forwarded by a relaying process, as described herein.

The second data device is further adapted to update its data description table in step S260 by adding data description values for received and stored data pieces.

The second data device is further adapted to send, according to a step S270, to the first data device an acknowledgement for a data piece sent from the first data device.

The second data device is further adapted to establish, according to a step S280, short-range communication with said one or more second data devices 210 capable of acting as relay devices, or wireless communication with an Access Point of a communications network connected to said relaying server being connectable to the intended end destination.

The first data device receives the acknowledgement for a sent data piece, in step S160. Then, the first data device is configured to perform post-transfer operations according to S170.

One alternative operation of said post-transfer operations involves to remove a relayed or sent data piece from its storage and corresponding data description values from the data description table, if the estimated probability, $P_{relay}$, for next network connectivity for said second data device is higher or equal to the transfer probability, $P_{data}$, for the identified data piece.

According to yet another alternative operation of said post-transfer operations, the second alternative post-transfer operations involves to keep a sent data piece and update corresponding data description values in the data description table, if the estimated probability, $P_{relay}$, for next network connectivity for said second data device is less than the transfer probability, $P_{data}$, for the identified data piece.

Thus, the first data device updates the corresponding data description values in the data description table, with the new calculated transfer probability, $P_{data,\ new}$, for the identified data piece if the estimated probability, $P_{relay}$, for next network connectivity for said second data device is less than the transfer probability, $P_{data}$, for the identified data piece.

Further, a data device has to check whether the transfer deadline $t_d$ has lapsed for any of the stored data pieces. The check of the transfer deadline $t_d$ may be done either within the transferring process, or periodically outside the transferring process. If the step of checking the transfer deadline $t_d$ is a part of the transferring process, it may be performed anywhere in the method S100 of the transferring process, e.g. between step S110 and S120 directly after the connection has been established but before sending the request to relay data pieces to the second data device, or in connection with step 170, post-transfer operation.

The purpose with the transfer deadline check is to eliminate data pieces of which the transfer deadline has lapsed from the dedicated storage, buffer, and the data description table. The advantage is that storage area is released and too old data pieces will not be transferred.

Figure 6:
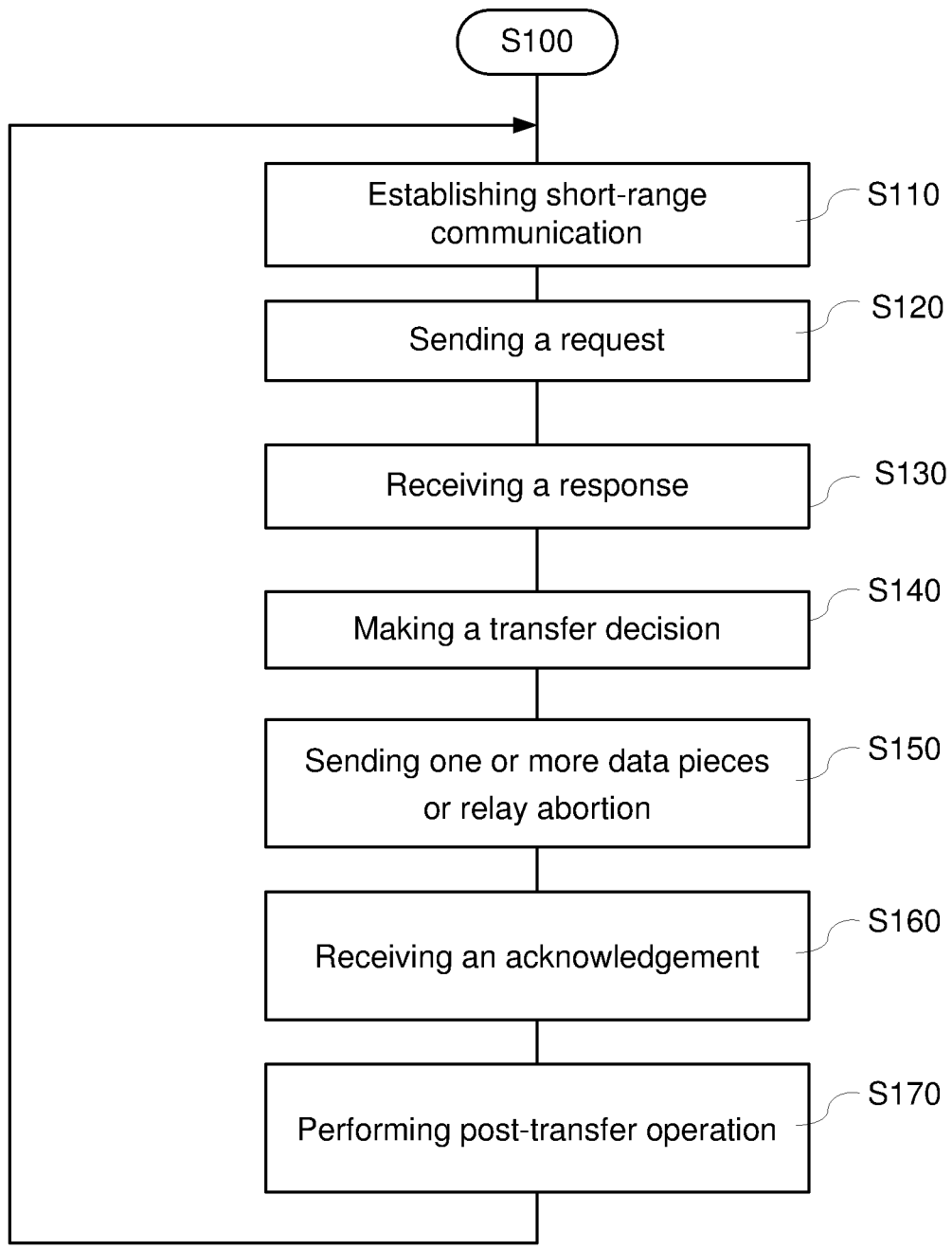
FIG. 6 is a flowchart showing an embodiment of the method of the transferring process in a first data device.

FIG. 6 is a flowchart showing an embodiment of the method of the transferring data pieces from a first data device. The embodiment supports the transferring process and embodiments thereof described above in this description.

The present embodiment of the method S100 enables a first data device (110 in FIG. 1) to transfer data pieces to a server site (150 in FIG. 1) or end destination (170 in FIG. 1) by means of at least one second data device (210 in FIG. 1). Each of said at least one second data devices is capable of acting as a relay device by forwarding data pieces via a radio interface towards an end destination addressed in the data pieces. Said method comprises:
  Establishing short-range communication, S110: —Establishing short-range communication with a second data device;
  Sending a request, S120: —Sending a request to relay one or more identified data pieces to said second data device being capable of acting as a relay device;
  Receiving a response, S130:—Receiving a response comprising information regarding which one or more identified data pieces that are accepted by said second data device for relaying and information regarding estimated next network connectivity time and an estimated probability, $P_{relay}$, for next network connectivity for said second data device;
  Making a transfer decision, S140:—Making a data transfer decision for an identified data piece based on said information regarding estimated next network connectivity time and the estimated probability, $P_{relay}$, for next network connectivity for said second data device and a corresponding transfer probability, $P_{data}$, for said identified data piece and data piece deadline $t_d$ for said identified data piece;
  Sending one or more data pieces or relay abortion; S150:—Sending, based on said data transfer decision, either one or more identified data pieces or a relay abortion to said second data device.

According to this embodiment, the method S100 may further comprise a step of:
  Receiving an acknowledgement, S160:—Receiving an acknowledgement for a data piece sent to the receiving second data device;
  Performing post-transfer operation; S170:—Performing post-transfer operation.

The post-transfer operation of S170 may involve different alternative operations.
  According to one alternative, S170 comprises:
  Compare $P_{relay}$ to $P_{data}$;
  remove a sent data piece from its storage and corresponding data description values from the data description table, if the estimated probability, $P_{relay}$, for next network connectivity for said second data device is higher or equal to the transfer probability, $P_{data}$, for the identified data piece.

According to one other alternative of post-transfer operations, S170 comprises:

check if $t_d$ is still valid or has lapsed;

removing a data piece from its storage and corresponding data description values from the data description table, if the transfer deadline, $t_d$, for said identified data piece has lapsed.

According to further one other alternative of post-transfer operations, S170 comprises:

Compare $P_{relay}$ to $P_{data}$;

keep a sent data piece in the buffer if the estimated probability, $P_{relay}$, for next network connectivity for said second data device is less than the transfer probability, $P_{data}$, for the identified data piece;

calculate a new transfer probability, $P_{data,\,new}$, by using the formula $$P_{data,new}=(P_{data}-P_{relay})/(1-P_{relay});\text{ and}$$

update corresponding data description values in the data description table, by replacing the existing $P_{data}$ for the identified data piece with the calculated new data description value $P_{data,\,new}$.

Figure 7:
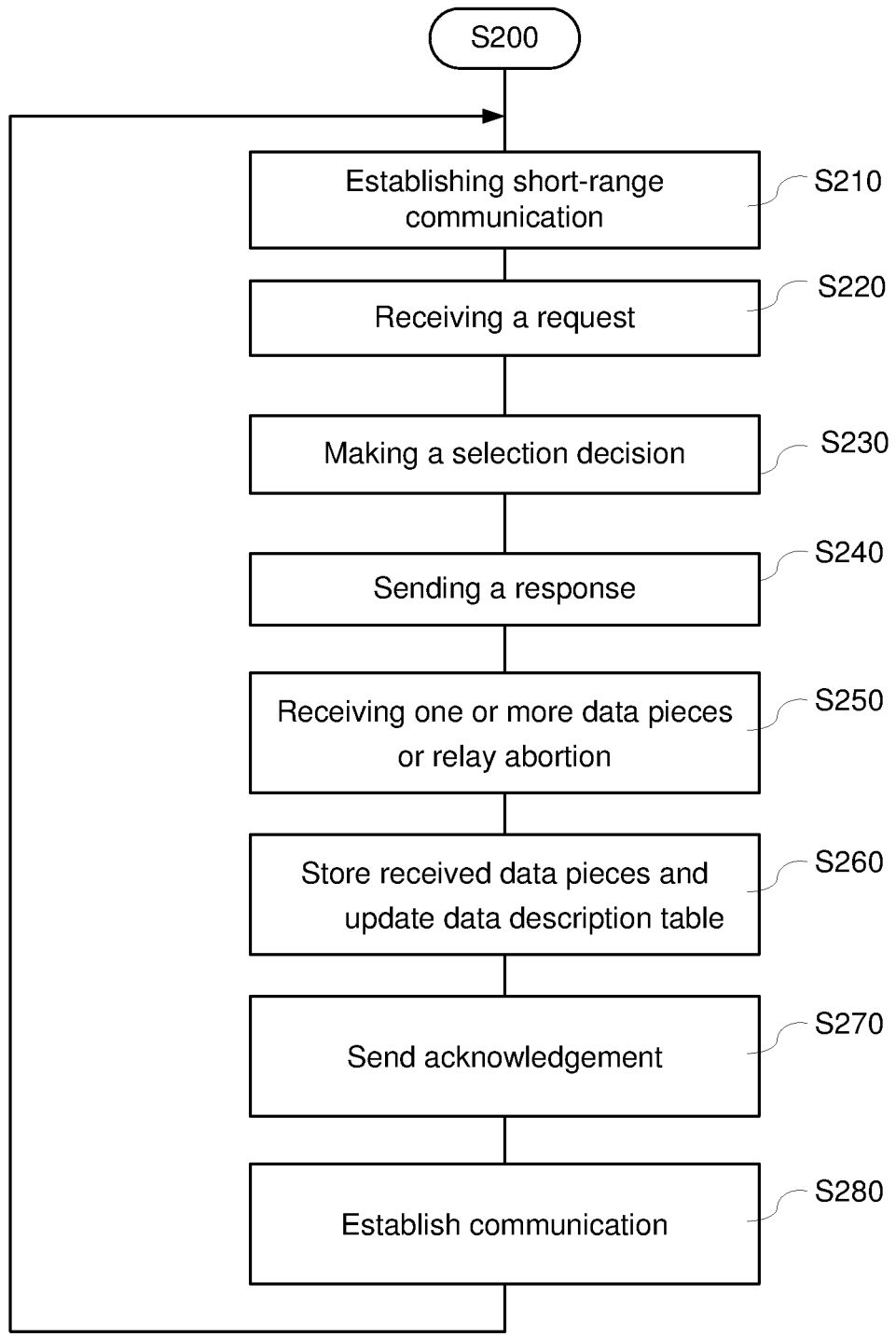
FIG. 7 is a flowchart showing an embodiment of the method in a second data device.

FIG. 7 is a flowchart showing an embodiment of a method of the transferring process in a second data device.

The transferring process may comprise an embodiment of the above described method S200, which is performed in a data device acting as relaying device, i.e. a second device. The data device (210 in FIG. 1) is capable of acting as a relay device for one or more data pieces received from a first data device (110 in FIG. 1). Said one or more data pieces DP have an addressed end destination in a network. The method comprises:

Establishing short-range communication, S210:—establishing short-range communication with the first data device;

Receiving a request, S220:—receiving a request to relay one or more identified data pieces;

Making a selection decision, S230:—making a selection decision for each of said one or more identified data pieces. The step of making a selection decision may further comprise following sub-steps:

checking if said one or more identified data pieces are registered in the data device; and selecting identified data pieces not registered in the data device;

Sending a response, S240:—sending a response comprising information regarding which one or more identified data pieces are selected by the data device for relaying and information regarding estimated next network connectivity time and an estimated probability, $P_{relay}$, for next network connectivity for said data device.

In step S230, the second data device makes a decision on whether to accept or deny relaying each of the data pieces in the request. The selection decision is based on whether the second device already has this data piece(s). To find out, it compares whether each data ID from the data device's request is already stored in the second data device's data description table.

According to one embodiment of the method S200, the making of a selection decision, S230, for each of said one or more identified data piece is based on registered content in the data storage dedicated for said one or more identified data pieces DP:s and/or the data device's data description table.

The method S200 may further comprise the step of

Receiving one or more data pieces, or relay abortion, S250:—receiving one or more data pieces, or a relay abortion;

The method may further comprise the step of

Store received data pieces and update data description table, S260:—storing received one or more data pieces in a dedicated memory storage, and updating a data description table by adding data description values for received and stored data pieces.

The method may further comprise step of

Sending acknowledgement, S270:—sending an acknowledgement for each received data piece to the sending first data device.

Establish communication, S280:—establishing (S280) short-range communication with said one or more second data devices (210) capable of acting as relay devices, or wireless communication with an Access Point of a communications network connected to said relaying server being connectable to the intended end destination.

Figure 8:
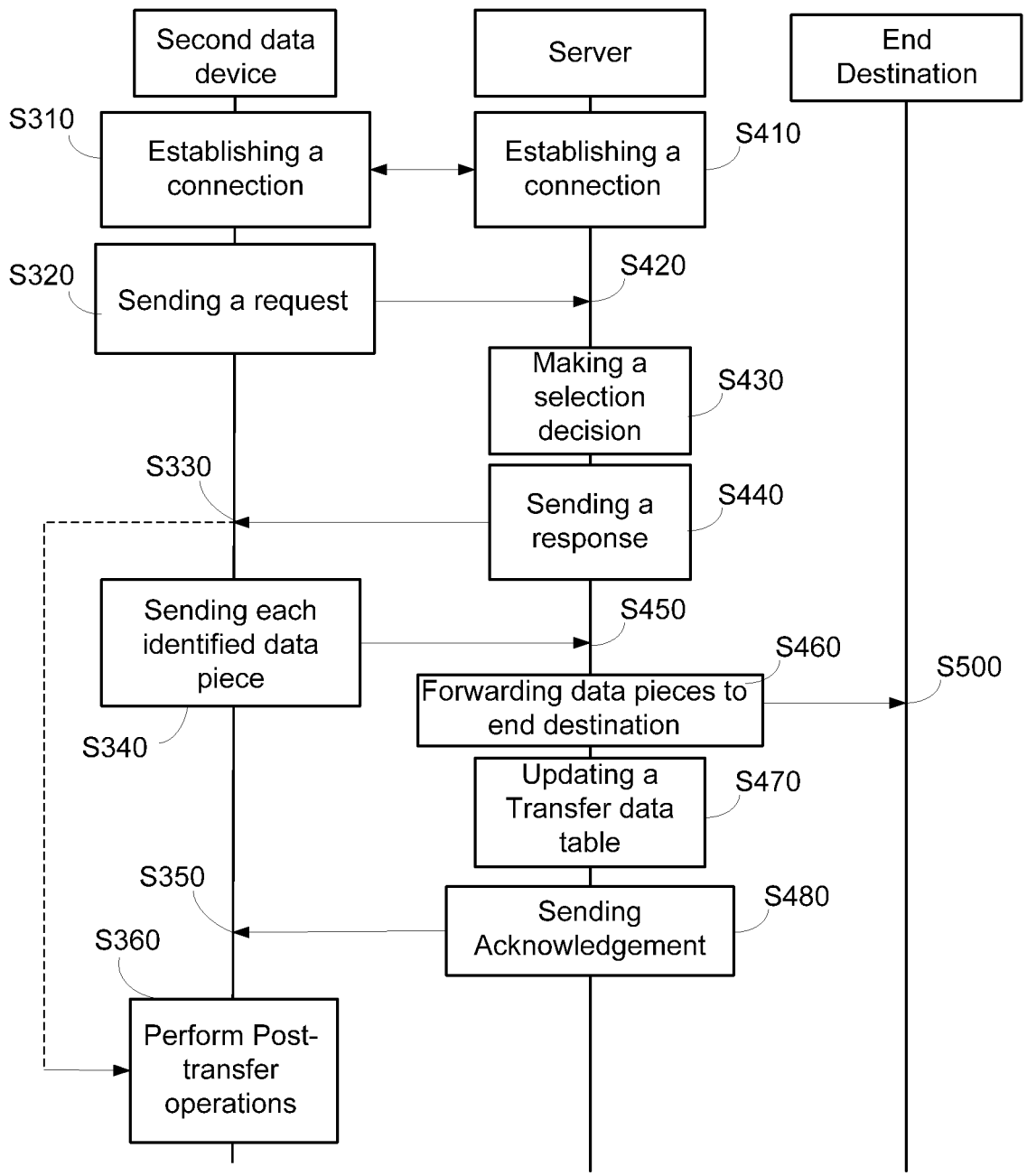
FIG. 8 is a signalling scheme illustrating a transferring process for data pieces from a data device via a server.

FIG. 8 is a signalling scheme illustrating a transferring process for data pieces from a data device via a server to an addressed end destination in a network.

The transferring process comprises one method S300 in a second data device and a corresponding method S400 in a server node.

The first data devices communicates via short-range communication with one or more second data devices (210 in FIG. 1) which are capable of operating as relay devices. The server may be a network host which acts as a proxy server for incoming data pieces with the additional function of keeping track of which data pieces it forwards towards the intended end destination by means of a transfer data table. Each entry in the transfer data table contains the data ID of the data pieces it has received and has forwarded towards the end destination.

A second data device (210, 310 in FIG. 1) comes within the radio coverage (130 in FIG. 1) of an access point AP, and the AP and the data device establishes wireless connection, in steps S310 and S410. When a link or channel is established, the device and the proxy server are capable of communicating via said AP, such as e.g. a base station (see FIG. 1), WiFi hot spot, etc.

The data device sends to said proxy server, in a step S320, a request to receive one or more identified data pieces. Said proxy server is capable of receiving the received data pieces, in a step S420:—receiving a response for data proxy server on the data IDs of the data pieces eligible for transfer.

In a step S430, the data proxy server makes a selection decision on which data pieces to transfer based on the data pieces already stored to eliminate that one or more data pieces are receive. Then, a response is sent from the server node, in a step S440. Said response comprises information regarding which one or more identified data pieces that are selected.

In a step S330, the second data device receives the sent response. Step S330 may comprise a check for controlling if the response is empty, i.e. none of the data pieces in the request was selected by the server. Then, the method S300 jumps to a step 360. If a data piece is not accepted to be relayed to the server, said data piece may be removed from its storage or buffer in the step S360, wherein the corresponding data description values also are deleted from the data description table.

If the response is not empty, the data device sends, in a step S340, each identified data piece that is accepted by the server and indicated in the response.

The server receives one or more data pieces, in a step S450. In a following step, S460, the proxy server forwards data pieces towards the data piece's intended, e.g. addressed, end destination (in the network).

Thus, after a data piece and corresponding data description values has been relayed according to step S340, the data description table of the data device needs to be updated as well as the data transfer table in the server. Said updates are performed in a step S360 of the method S300 in the data device and in a step S470 of the method S400 in the server.

Thus, in step S470, the proxy server updates the transfer data description table with data IDs of the data pieces forwarded towards the end destination in the previous step, S460.

The server may send an acknowledgement, in a step S480, indicating successful forwarding of data pieces towards their intended, e.g. addressed, end destination.

The data device receives the acknowledgement for a sent data piece, in step S350. Then, the data device is configured to perform post-transfer operations according to a step S350.

The data device is adapted to perform post-transfer operations in step S360, wherein each transferred data piece is removed from the storage, or buffer, and corresponding data description values are also deleted from the data description table.

Figure 9:
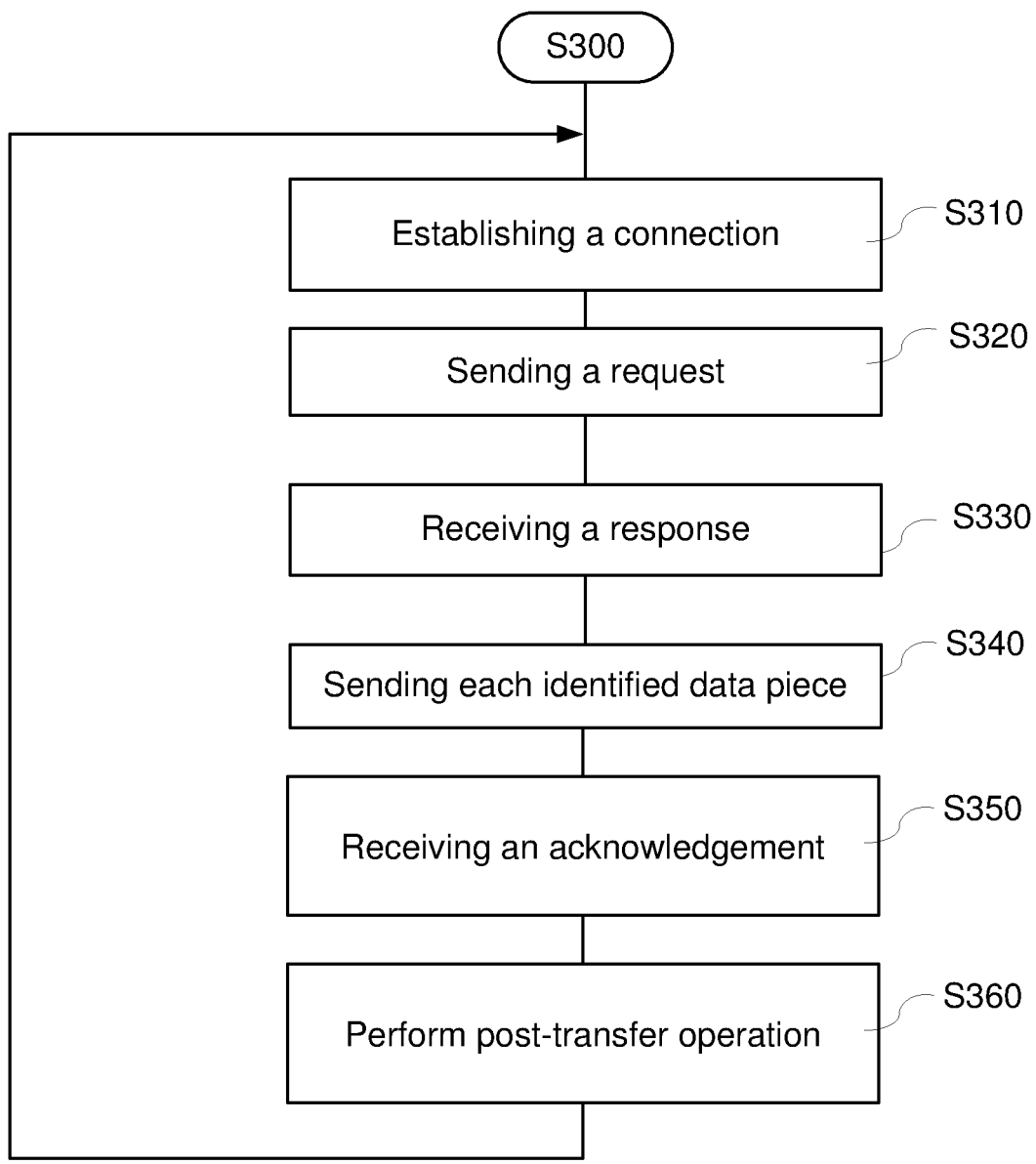
FIG. 9 is a flowchart showing a method for transferring data from a data device to a server in a server node.

FIG. 9 is a flowchart showing a method for transferring data from a data device to a server in a server node. The method S300 performed in a data device may comprise all or some of the following listed steps.

Establishing a connection, Step S310:—Establishing a connection with a server via a radio access point;

Sending a request, Step S320:—Sending a request to relay one or more identified data pieces to the server;

Receiving a response, Step S330:—Receiving a response comprising information regarding which one or more identified data pieces that are accepted by the server;

Sending each identified data piece, Step S340:—Sending each identified data piece, if the received response comprises information regarding which one or more identified data pieces that are accepted by the server;

Receiving an acknowledgement, Step S350:—Receiving an acknowledgement for a data piece sent to the receiving second data device;

Perform post-transfer operation, Step S360:—Performing post-transfer operation.

Figure 10:
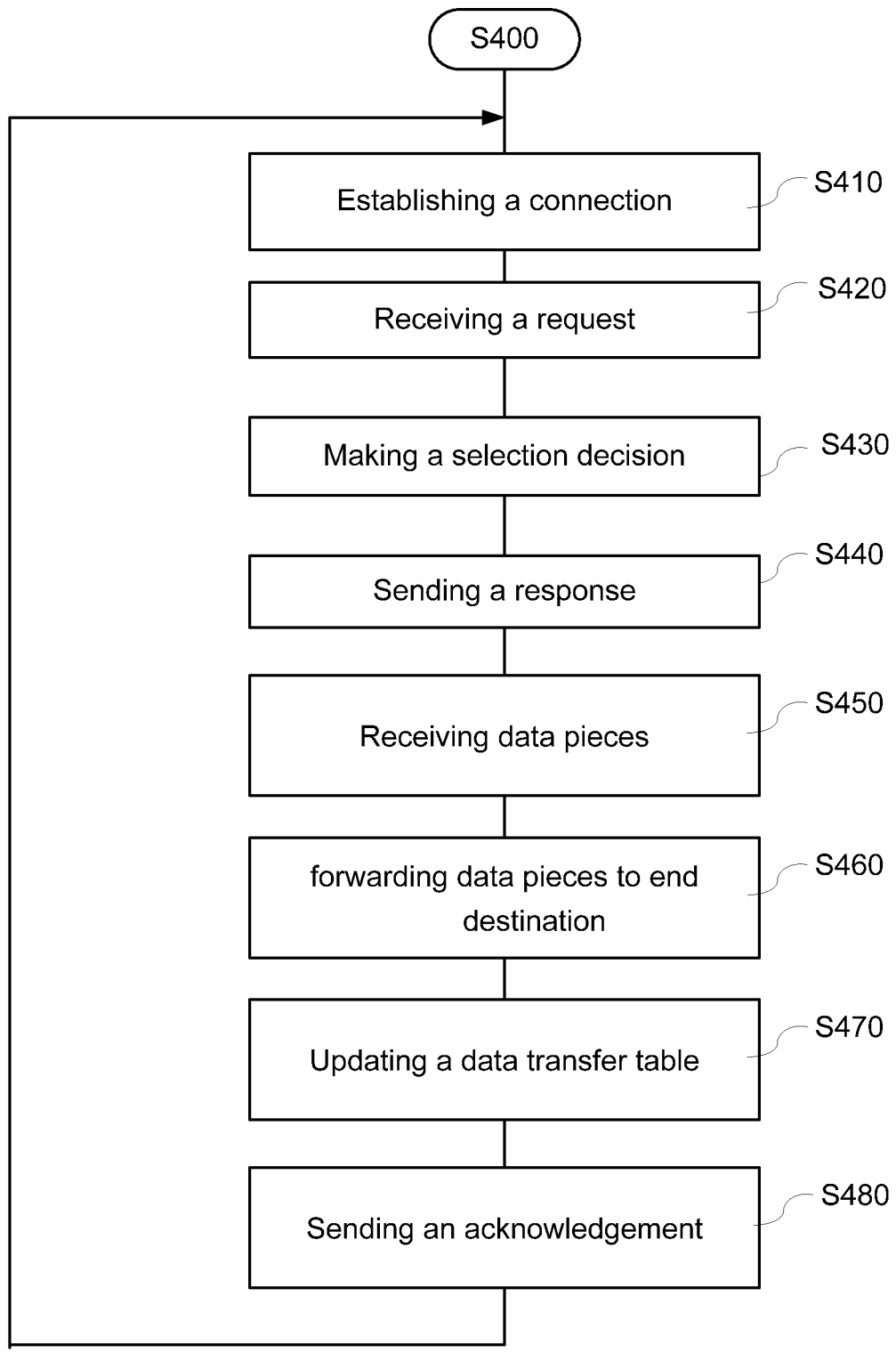
FIG. 10 is a flowchart showing a method in a server of server node of network.

FIG. 10 is a flowchart showing a method in a server of server node of network. The method S400 may comprise all or some of the following listed steps:

establishing a connection, Step S410:—establishing a connection with a second data device via a radio access point;

receiving a request, Step S420:—receiving a request to relay one or more identified data pieces;

making a selection decision, Step S430:—making a selection decision for each of said one or more identified data pieces;

sending a response, Step S440:—sending a response comprising information regarding which one or more identified data pieces are selected;

receiving data pieces, Step S450:—receiving one or more data pieces;

forwarding data pieces to end destination, Step S460:—forwarding one or more data pieces towards the data piece's addressed end destination;

updating a transfer data table, Step S470:—updating a table with data IDs of the data pieces forwarded sending an acknowledgement, Step S480:—sending an acknowledgement for each received data piece to the second data device.

The above described technique may be implemented in digital electronically circuitry, or in computer hardware, firmware, software, or in combinations of them. Apparatus of the technique may be implemented in a computer program product tangibly embodied in a machine readable storage device for execution by a programmable processor in a processing circuitry; and method steps of the technique may be performed by a programmable processor in a processing circuitry executing a program of instructions to perform functions of the technique by operating on input data and generating output.

Figure 11:
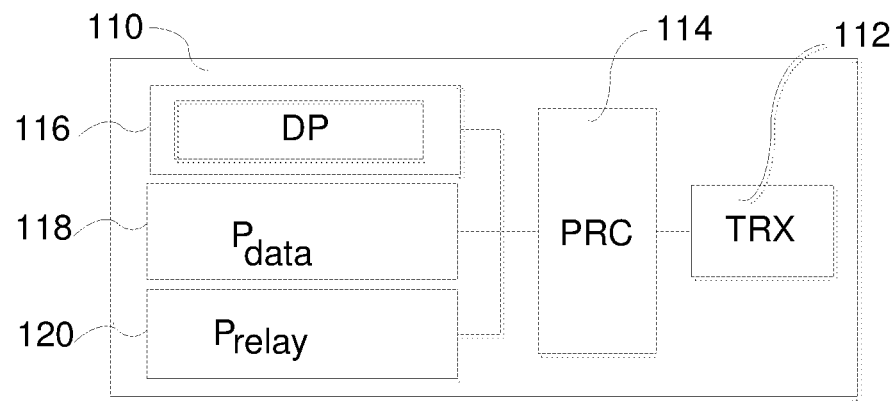
FIG. 11 is a schematic illustration of a data device adapted for transferring of data pieces.

FIG. 11 is a schematic illustration of a data device adapted for transferring of data pieces. Said data device may be a first data device as well as a second data device, i.e. the data device is adapted and capable of acting as a relay device configured to receive data pieces and forward by sending said data pieces towards their address(-es), i.e. intended end destinations.

The data device 110, 210 is adapted to transfer data pieces (DP) generated by the data device itself or (temporary) stored in a memory storage 116.

Said data device comprises a processing circuitry 114. The above described methods may be implemented in a computer program product tangibly embodied in a machine readable storage device for execution by a programmable processor in a processing circuitry; and method steps of the method may be performed by a programmable processor in the processing circuitry executing a program of instructions to perform functions of the technique by operating on input data and generating output.

The processing circuitry 114 comprises at least one processor connected to one or more memory storage devices 116, 118, 120 comprising computer programs for controlling and operating said at least one processors. The processor will receive instructions and data from, e.g. a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially—designed ASICs (Application Specific Integrated Circuits).

The processing circuitry 114 is operative to:

establish short-range communication with a second data device;

send a request to relay one or more identified data pieces to said second data device being capable of acting as a relay device;

receive a response comprising information regarding which one or more identified data pieces that are accepted by said second data device for relaying and information regarding estimated next network connectivity time and an estimated probability, $P_{relay}$, for next network connectivity for said second data device;

make a data transfer decision for an identified data piece, DP, based on said information regarding estimated next network connectivity time $t_w$ and the estimated probability, $P_{relay}$, for next network connectivity for said second data device and a corresponding transfer probability, $P_{data}$, for said identified data piece and data piece deadline $t_d$ for said identified data piece;

send, based on said data transfer decision, either one or more identified data pieces or a relay abortion to said second data device.

The data device is also capable of acting as a second data device 210, i.e. relay device, for one or more data pieces DP received from a first data device 110. Each data piece is addressed to an end network destination 170. To be capable of acting as a second data device 210, the processing circuitry 114 is therefore operative to:
- establish short-range communication with the first data device;
- receive a request to relay one or more identified data pieces;
- make a selection decision for each of said one or more identified data pieces;
- send a response comprising information regarding which one or more identified data pieces are accepted by said second data device for relaying and information regarding estimated next network connectivity time and an estimated probability, $P_{relay}$, for next network connectivity for said second data device.

Thus, the data device is adapted to support and perform the steps of the methods S100 and S200 and the corresponding embodiments described above.

Figure 12:
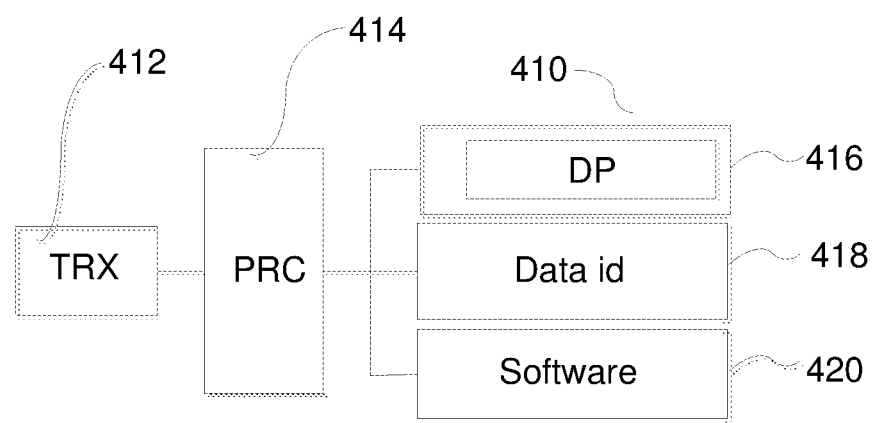
FIG. 12 is a schematic illustration of a server adapted for forwarding data pieces to intended end destinations.

FIG. 12 is a schematic illustration of a server for forwarding data pieces to end destinations.

The server 410 is adapted to forward data pieces DP generated by the data device itself or (temporary) stored in a memory storage 416. The server 410 also comprises transfer data table storage 418.

Said server 410 comprises a processing circuitry 414. The above described method S400 may be implemented in a computer program product tangibly embodied in a machine readable storage device for execution by a programmable processor in a processing circuitry; and method steps of the method may be performed by a programmable processor in the processing circuitry executing a program of instructions to perform functions of the technique by operating on input data and generating output.

The processing circuitry 414 comprises at least one processor connected to one or more memory storage devices 420 comprising computer programs for controlling and operating said at least one processors. The processor will receive instructions and data from, e.g. a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially—designed ASICs (Application Specific Integrated Circuits).

The server may be a network host which acts as a proxy for incoming data pieces from data devices, wherein first data devices communicates via short-range communication with one or more second data devices capable of operating as relay devices. The server comprises a processing circuitry 414 is operative to:
- establish a connection with a data device via a radio access point;
- receiving a request to relay one or more identified data pieces;
- make a selection decision for each of said one or more identified data pieces;
- send a response comprising information regarding which one or more identified data pieces are selected;
- receive one or more data pieces;
- forward one or more data pieces towards the data piece's intended end destination;
- update a table with data IDs of the data pieces forwarded;
- send an acknowledgement for each received data piece to the second data device.

Figure 13A:
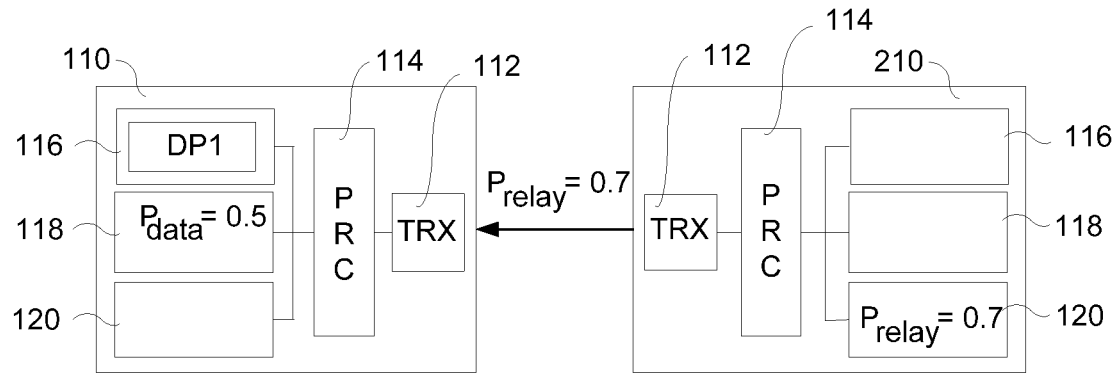
FIGS. 13A, 13B and 13C are a sequence of block diagrams illustrating an example of the transferring process of a data peace DP1 between two data devices.
Figure 13B:
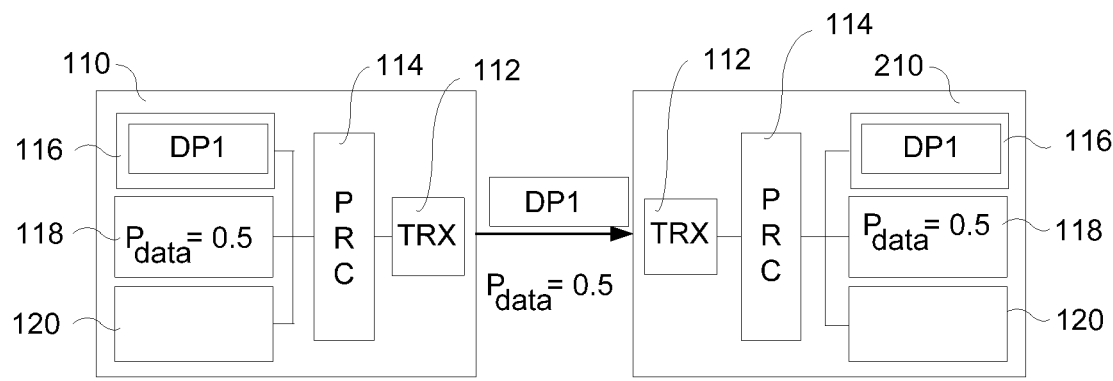
Figure 13C:
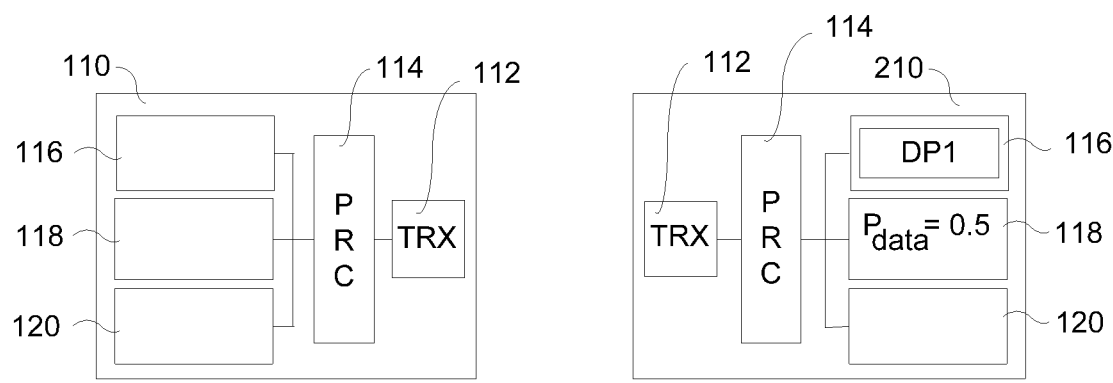

FIGS. 13A, 13B and 13C are a sequence of block diagrams illustrating an example of the transferring of a data peace DP1 between two data devices according to the above described method.

Thus, said figures illustrates a first data device 110 and a second data device 210, wherein both data devices comprise a transceiver module 112 for receiving and transmitting radio traffic, a processor circuitry, PRC, 114 for enabling the functionalities of the data devices and a number of storages 116, 118 and 120.

FIG. 13A illustrates a first moment in the transferring process. The first data device comprises a memory storage 116, which may be a buffer. Said buffer comprises a data peace DP1. In a memory storage connected to the PRC 114 is a data description table 118 stored comprising the data description values for the stored data pieces, in this example the data description values for DP1. In FIG. 13A is only the transfer probability $P_{data}$ for DP1 illustrated. It is set to 0.5 for DP1. The transfer window table 120 is also stored in a memory storage. The second data device comprises the same electronic components/circuitry: transceiver 112, PRC 114, a buffer 116, a data description table 118 and transfer window table 120. The buffer 116 and the data description table 118 of the second data device are for the moment empty.

In the illustrated first moment, following steps in the transferring process has been executed and performed: short-range communication between the first and second data devices have been established; a request to relay one or more identified data pieces has been sent and received; the second data device has made a selection decision for a data peace DP1; and a response comprising information regarding which one or more identified data pieces, in this case DP1, are accepted by said second data device 210 for relaying, information regarding estimated next network connectivity time and an estimated probability, $P_{relay}$, for next network connectivity for said second data device. The $P_{relay}$ is set to 0.7.

According to what is illustrated in FIG. 13A, the relay device 210 responds to a request from the first data device 110 and sends the network connection probability, $P_{relay}$. The PRC 114 is configured to compare the network connection probability, $P_{relay}$, to the transfer probability $P_{data}$ for DP1.

Since $P_{relay}=0.7>P_{data}=0.5$, the first data device is configured to transmit the data piece DP1 and its corresponding transfer probability $P_{data}$ and other data description values. The transmission of the data piece DP1 and its corresponding transfer probability $P_{data}$ and other data description values is illustrated in FIG. 13B.

Once DP1 and its corresponding transfer probability $P_{data}$ has been received, the relay device updates its data description table 118 with $P_{data}$ and stores the data piece DP1 in buffer 116.

In FIG. 13C, the result of the post-transfer operation is illustrated.

When the first data device 110 gets an acknowledgement that the data piece has been received from the relay device 210, the first data device 110 removes the data piece DP1 from its buffer 116 and $P_{relay}$ for the sent data piece DP1 from its data description table 118.

Note that for reasons of simplicity, in this example focus is on the probability of transfer, not taking under account the time constraints, e.g. the deadline $t_d$ for transferring a certain data piece.

Figure 14A:
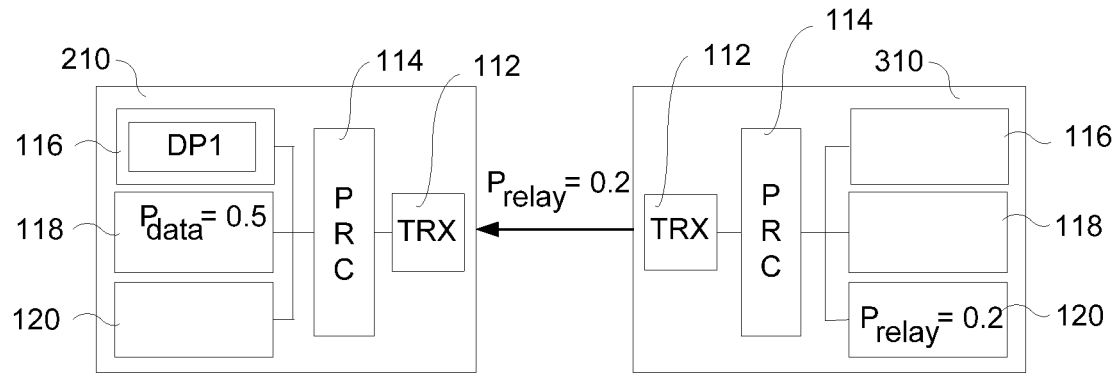
FIGS. 14A, 14B and 14C are a sequence of block diagrams illustrating another example of the transferring process of a data peace DP1 between two data devices.
Figure 14B:
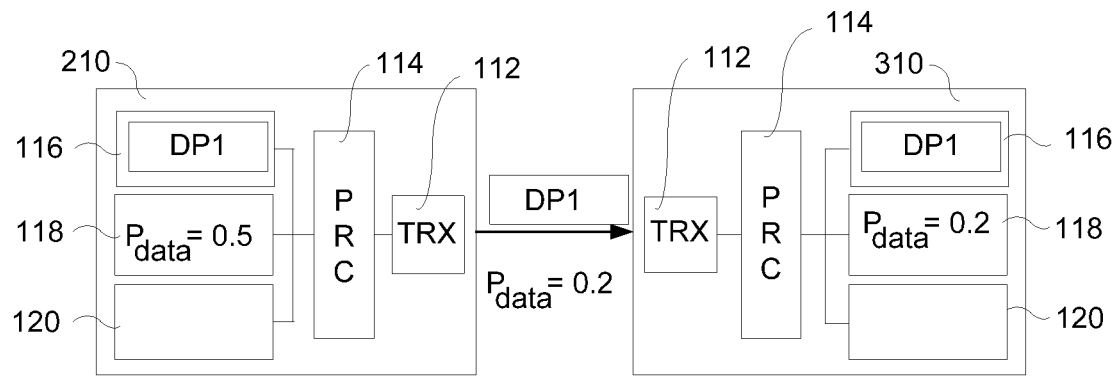
Figure 14C:
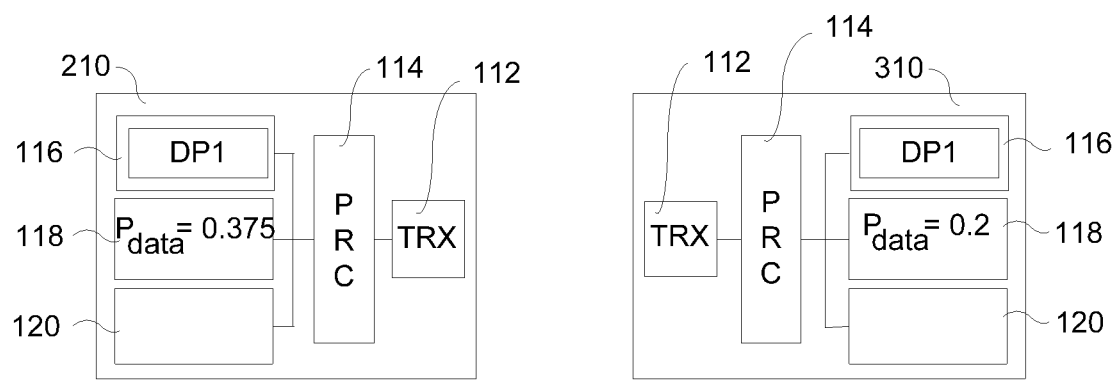

Another example of the transferring of a data peace DP1 between two data devices according to the above described method is illustrated in the sequence of block diagrams, FIGS. 14A-14C.

Thus, said figures illustrates a first data device 210 and a second data device 310, wherein both data devices comprise a transceiver module 112 for receiving and transmitting radio traffic, a processor circuitry, PRC, 114 for enabling the functionalities of the data devices and a number of storages 116, 118 and 120. Note that in the previous example illustrated in FIGS. 14A-14C, the data device 210 was the second data device receiving the data piece DP1 to be relayed from a first data device 110. In the following described transfer process, the data device 210 is the first data device and another data device 310 will act as a relay device, i.e. a second data device 310.

FIG. 14A illustrates a first moment in the transferring process. The first data device comprises a memory storage 116, which may be a buffer. Said buffer comprises a data peace DP1. In a memory storage connected to the PRC 114 is a data description table 118 stored comprising the data description values for the stored data pieces, in this example the data description values for DP1. In FIG. 14A is only the transfer probability $P_{data}$ DP1 illustrated. It is set to 0.5 for DP1. The transfer window table 120 is also stored in a memory storage. The second data device 310 comprises equivalent electronic components/circuitry: transceiver 112, PRC 114, a buffer 116, a data description table 118 and transfer window table 120. The buffer 116 and the data description table 118 of the second data device are for the moment empty.

In the illustrated first moment, following steps in the transferring process has been executed and performed: short-range communication between the first and second data devices have been established; a request to relay one or more identified data pieces has been sent and received; the second data device has made a selection decision for a data peace DP1; and a response comprising information regarding which one or more identified data pieces, in this case DP1, are accepted by said second data device 210 for relaying, information regarding estimated next network connectivity time and an estimated probability, $P_{relay}$, for next network connectivity for said second data device. The $P_{relay}$ is set to 0.2.

According to what is illustrated in FIG. 14A, the relay device 310 responds to the request of the first data device 210 and sends the network connection probability, $P_{relay}$. The PRC 114 is configured to compare the network connection probability, $P_{relay}$, to the transfer probability $P_{data}$ for DP1.

The network connection probability, $P_{relay}$, for the second data device is 0.2.

Since $P_{relay}=0.2<P_{data}=0.5$, the first data device 210 is configured to transmit the data piece DP1 and its corresponding transfer probability $P_{data}$ and other data description values. The transmission of the data piece DP1 and its corresponding transfer probability $P_{data}$ and other data description values are illustrated in FIG. 14B.

Once DP1 and its corresponding transfer probability $P_{data}$ has been received, the relay device updates its data description table 118 with $P_{data}$ and stores the data piece DP1 in buffer 116.

In FIG. 14C, the result of the post-transfer operation is illustrated.

When the first data device 210 gets an acknowledgement that the data piece has been received from the relay device 310, the first data device 210 does not remove the data piece DP1 from its buffer 116 and $P_{data}$ for the sent data piece DP1 from its data description table 118. In the case of $P_{data}>P_{relay}$, the relay device's promise to relay data is lower than the required reliability for data delivery, so even after relaying, it is needed to continue hold the data piece for future probabilistic delivery. However, the $P_{data}$ can be updated as the first data device 210 is not solely responsible for data delivery.

The formula for update is as based on statistic theory and shown follows:

$$P_{data,new}=(P_{data}-P_{relay})/(1-P_{relay})$$

Thus, the previous $P_{data}$ is replaced by the calculated $P_{data, new}$ in the data description table 118 of the first data device 210. The new calculated $P_{data, new}=0.375$.

In FIGS. 11 and 12 the memories may be one memory comprising three data storage areas. It is understood that the memory may comprise a different number of storage areas, and the illustrated number of memory storages only is for illustrative purposes. Further, one or several of memories or data storage areas may be physically separated from the other data storage areas, or may reside on the same physical media.

The entities and units described above with reference to FIGS. 11 and 12 are logical units, and do not necessarily correspond to separate physical units. Thus, the person skilled in the art would appreciate that the units disclosed in the embodiment in FIG. 11 or 12 may be implemented as physically integrated units, and/or physically separate units, and that the units are provided with appropriate processing circuits.

A number of embodiments of the present technology have been described. It will be understood that various modifications may be made without departing from the scope of the technology. Therefore, other implementations are within the scope of this disclosure.

The invention claimed is:

1. A method in a first data device for transferring data pieces to an intended end destination via a second data device capable of acting as a relay device, said method comprising:

sending to said second data device, via a short-range communication, a relay request to relay at least a data piece identified by an identifier included in the relay request, wherein the identifier uniquely identifies the data piece;

receiving a response transmitted by the second data device in response to the relay request, the response comprising first information indicating whether the identified data piece is accepted by said second data device for relaying, second information indicating an estimated next network connectivity time (Tw), and third information indicating an estimated probability for next network connectivity for said second data device (Prelay), wherein the second information and the third information are different;

determining whether to send to the second data device the identified data piece for relay by the second data device based on said second information indicating the Tw, said third information indicating the Prelay, a transfer probability (Pdata) for said identified data piece, and a data piece transfer deadline (td) for said identified data piece, wherein determining whether to send to the second data device the identified data piece for relay by the second data device comprises comparing the Tw and the td and/or comparing the Prelay and Pdata; and after determining to send to the second data device the identified data piece for relay by the second data device, sending to said second data device said identified data piece.

2. The method of claim 1, wherein the Pdata is a probability value indicating the importance of the identified data piece and the required reliability of successful data delivery.

3. The method of claim 1, wherein the identifier is a globally unique identifier (ID), said unique identifier has been generated by a data device being the source of the data piece, and using an identifier of said data device and an identifier of said data piece.

4. The method of claim 3, wherein the globally unique identifier (ID), transfer deadline, and transfer probability for the identified data piece are data description values stored as a data piece entry in a data description table.

5. The method of claim 1, wherein the method further comprises:

receiving an acknowledgement for a data piece sent to the receiving second data device.

6. The method of claim 1, wherein the method further comprises performing post-transfer operations.

7. A method in a second data device for relaying data pieces received from a first data device, the method comprising:

receiving, via a short-range communication, a request to relay a data piece identified by an identifier included in the request, wherein the identifier uniquely identifies the data piece;

making a selection decision for said identified data piece;

after making the selection decision, sending a response to the first data device, the response comprising first information indicating whether the identified data piece is selected by said second data device for relaying, second information indicating an estimated next network connectivity time (Tw), and third information indicating an estimated probability for next network connectivity for said second data device (Prelay), wherein the second information and the third information are different; and receiving, from the first data device, either the identified data piece or a relay abortion based on a data relay decision made by the first data device for said identified data piece, wherein the data relay decision is based on the second information indicating the Tw, the third information indicating the Prelay, a transfer probability (Pdata) for said identified data piece, and a data piece transfer deadline (td) for said identified data piece.

8. The method of claim 7, wherein the selection decision for the identified data piece is based on registered content in a data storage dedicated for one or more identified data pieces (DP).

9. The method of claim 7, wherein the method comprises:

storing received one or more data pieces in a dedicated memory storage.

10. The method of claim 7, wherein the method further comprises:

sending an acknowledgement for each received data piece to the sending first data device.

11. The method of claim 7, wherein the method further comprises:

establishing one of: a) short-range communication with a relay device and b) wireless communication with an Access Point of a communications network.

12. The method of claim 7, wherein the data relay decision comprises comparing the Tw and the td and/or comparing the Prelay and the Pdata.

13. A first data device adapted for transferring data pieces (DP) to an intended end destination, said first data device comprising:

a transmitter;
a receiver; and
processing circuitry operative to:
employ the transmitter to send to a second data device, via a short-range communication, a relay request to relay at least a data piece identified by an identifier included in the relay request, wherein the identifier uniquely identifies the data piece;

obtain, via the receiver, a response transmitted by the second data device in response to the relay request, the response comprising first information indicating whether the identified data piece is accepted by said second data device for relaying, second information indicating an estimated next network connectivity time (Tw), and third information indicating an estimated probability for next network connectivity for said second data device (Prelay), wherein the second information and the third information are different;

determine whether to send to the second data device the identified data piece for relay by the second data device based on said second information indicating the Tw, said third information indicating the Prelay, a transfer probability (Pdata) for said identified data piece, and a data piece transfer deadline (td) for said identified data piece, wherein determining whether to send to the second data device the identified data piece for relay by the second data device comprises comparing the Tw and the td and/or comparing the Prelay and Pdata; and employ the transmitter to send to said second data device said identified data piece after determining to send to the second data device the identified data piece for relay by the second data device.

14. The first data device of claim 13, wherein the transfer probability is a probability value indicating the importance of the identified data piece and the required reliability of successful data delivery.

15. The first data device of claim 13, wherein the identifier is a globally unique identifier (Data ID), said unique identifier has been generated by a data device being the source of the data piece and using an identifier of said data device and an identifier of said data piece generated by said data device being the source of the data piece.

16. The first data device of claim 15, wherein the globally unique identifier (Data ID), transfer deadline and transfer probability for an identified data piece are data description values stored as a data piece entry in a data description table.

17. The first data device of claim 13, wherein the processing circuitry is operative to:

obtain via the receiver an acknowledgement for a data piece sent to the second data device.

18. The first data device of claim 13, wherein the processing circuitry is operative to perform post-transfer operations.

19. A second data device comprising:

a transmitter;
a receiver; and processing circuitry operative to:
obtain via the receiver a relay request transmitted by a first data device, the relay request comprising a request to relay at least a data piece identified by an identifier in the relay request, wherein the identifier uniquely identifies the data piece;
make a selection decision for said identified data piece;
employ the transmitter to send to the first data device a response comprising first information indicating whether the identified data piece is selected by the data device for relaying, second information indicating an estimated next network connectivity time (Tw), and third information indicating an estimated probability for next network connectivity for the data device (Prelay), wherein the second information and the third information are different; and
obtain via the receiver either the identified data piece or a relay abortion based on a data relay decision made by the first data device for said identified data piece, wherein the data relay decision is based on the second information indicating the Tw, the third information indicating the Prelay, a transfer probability (Pdata) for said identified data piece, and a data piece transfer deadline (td) for said identified data piece.

20. The second data device of claim 19, wherein the making of a selection decision for said identified data piece is based on registered content in a data storage dedicated for relaying one or more identified data pieces.

21. The second data device of claim 19, wherein the processing circuitry further is operative to:
store received one or more data pieces in a dedicated memory storage.

22. The second data device of claim 19, wherein the processing circuitry further is operative to:
send an acknowledgement for each received data piece to the sending first data device.

23. The second data device of claim 19, wherein the processing circuitry further is operative to:
establish short-range communication with a relay device, or establish wireless communication with an Access Point of a communications network connected to a relaying server being connectable to an intended end destination.

24. The second data device of claim 19, wherein the data relay decision comprises comparing the Tw and the td and/or comparing the Prelay and the Pdata.

25. A method in a server for forwarding data pieces from a first data device to intended end destinations, the server being a network host which operates as a proxy for incoming data pieces from data devices, wherein the first data device communicates via short-range communication with one or more second data devices capable of operating as relay devices, the method comprising:
establishing a connection with a second data device operating as a relay device via a radio access point;
receiving from the second data device a request to relay an identified data piece, wherein said identified data piece has been relayed from the first data device to the second data device based on a data relay decision made by the first data device for said identified data piece, the data relay decision being based on first information indicating an estimated next network connectivity time (Tw), second information indicating an estimated probability for next network connectivity for the second data device (Prelay), a transfer probability (Pdata), and data piece transfer deadline (td) for said identified data piece, wherein the first information and the second information are different, and the data relay decision comprises comparing the Tw and the td and/or comparing the Prelay and Pdata;
making a selection decision for said identified data piece;
sending a response comprising information regarding a selection of said identified data piece;
receiving one or more data pieces from the second data device;
forwarding one or more data pieces towards the intended end destination of the data pieces;
updating a table with data IDs identifying the data pieces forwarded; and
sending an acknowledgement for each received data piece to the second data device.

26. A server adapted for forwarding data pieces to intended end destinations, the server being a network host which operates as a proxy for incoming data pieces from data devices, wherein the first data device communicates via short-range communication with one or more second data devices capable of operating as relay devices, the server comprising:
a transmitter;
a receiver; and
processing circuitry operative to:
establish a connection with a second data device operating as a relay device via a radio access point;
receive from the second data device a request to relay one or more identified data pieces, wherein said one or more identified data pieces have been relayed from the first data device to the second data device based on a data relay decision made by the first data device for said one or more identified data pieces, the data relay decision being based on first information indicating an estimated next network connectivity (Tw), second information indicating an estimated probability for next network connectivity for the second data device (Prelay), a transfer probability (Pdata), and data piece transfer deadline (td) for said one or more data pieces, wherein the first information and the second information are different, and the data relay decision comprises comparing the Tw and the td and/or comparing the Prelay and Pdata;
make a selection decision for each of said one or more identified data pieces;
send a response comprising information regarding which one or more identified data pieces are selected;
receive one or more data pieces;
forward one or more data pieces towards the data piece's intended end destination;
update a table with data IDs identifying the data pieces forwarded;
send an acknowledgement for each received data piece to the second data device.

* * * * *